United States Patent [19]
Nishino et al.

[11] Patent Number: 5,988,310
[45] Date of Patent: Nov. 23, 1999

[54] ELECTRIC POWER STEERING CONTROL SYSTEM

[75] Inventors: Kazuhisa Nishino; Yuji Takatsuka; Shun-Ichi Wada, all of Himeji, Japan

[73] Assignee: Mitsubishi Denki Kabushiki Kaisha, Tokyo, Japan

[21] Appl. No.: 09/162,515

[22] Filed: Sep. 29, 1998

Related U.S. Application Data

[62] Division of application No. 08/532,014, Sep. 21, 1995, Pat. No. 5,839,537.

[30] Foreign Application Priority Data

Mar. 9, 1995 [JP] Japan ........................ 7-49897

[51] Int. Cl.$^6$ ........................................ B62D 5/04
[52] U.S. Cl. ................................ 180/443; 701/41
[58] Field of Search ................. 701/41, 43; 180/443, 180/446

[56] References Cited

U.S. PATENT DOCUMENTS

| | | | |
|---|---|---|---|
| 4,456,087 | 6/1984 | Lang et al. ........................... | 180/423 |
| 4,756,375 | 7/1988 | Ishikura et al. ..................... | 180/446 |
| 4,809,173 | 2/1989 | Fukami et al. . | |
| 4,887,682 | 12/1989 | Drutchas et al. ................... | 180/446 |
| 4,896,735 | 1/1990 | Marihsita . | |
| 5,000,278 | 3/1991 | Morishita ........................... | 180/446 |
| 5,563,790 | 10/1996 | Wada et al. ........................ | 180/446 |

FOREIGN PATENT DOCUMENTS

| | | |
|---|---|---|
| 0631922 | 1/1995 | European Pat. Off. . |
| 2613680 | 10/1988 | France . |
| WO8702632 | 5/1989 | WIPO . |

*Primary Examiner*—Lanna Mai
*Assistant Examiner*—Avraham Lerner
*Attorney, Agent, or Firm*—Sughrue, Mion, Zinn, Macpeak & Seas, PLLC

[57] ABSTRACT

An electric power steering control system in which the steering "feel" is improved, having a steering force detector an electric motor for producing an auxiliary steering force, a motor current detector and a control unit for deciding the motor current value and rotational direction at least in accordance with the detected steering force. The motor current is limited in accordance with the detected steering force and motor current values.

5 Claims, 25 Drawing Sheets

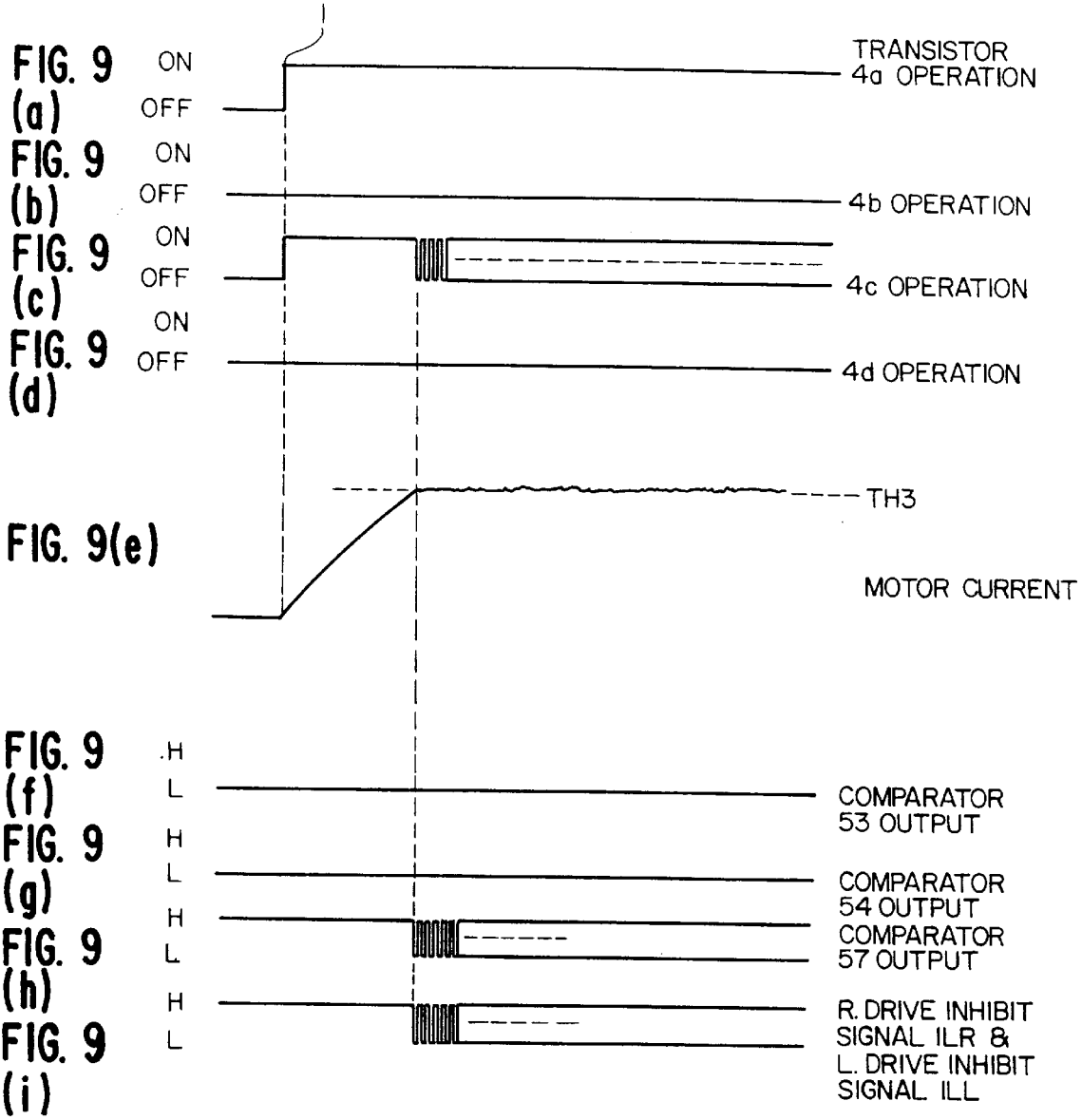

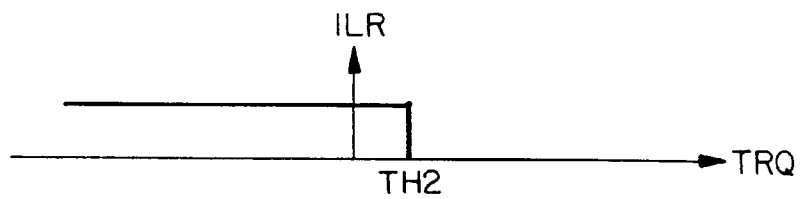
FIG. 10(a)
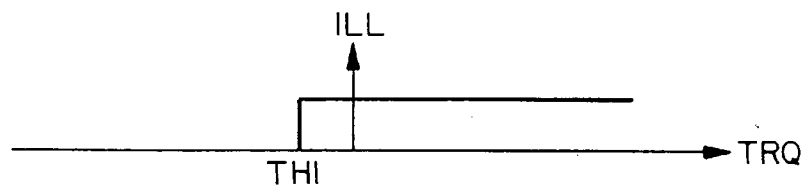
FIG. 10(b)
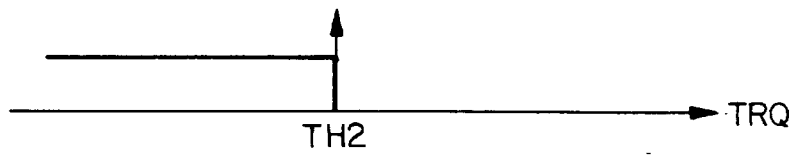
FIG. 11(a)
FIG. 11(b)
FIG. 19
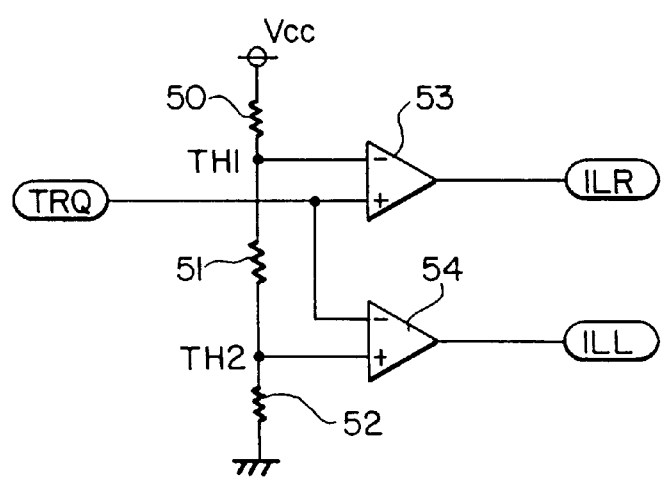

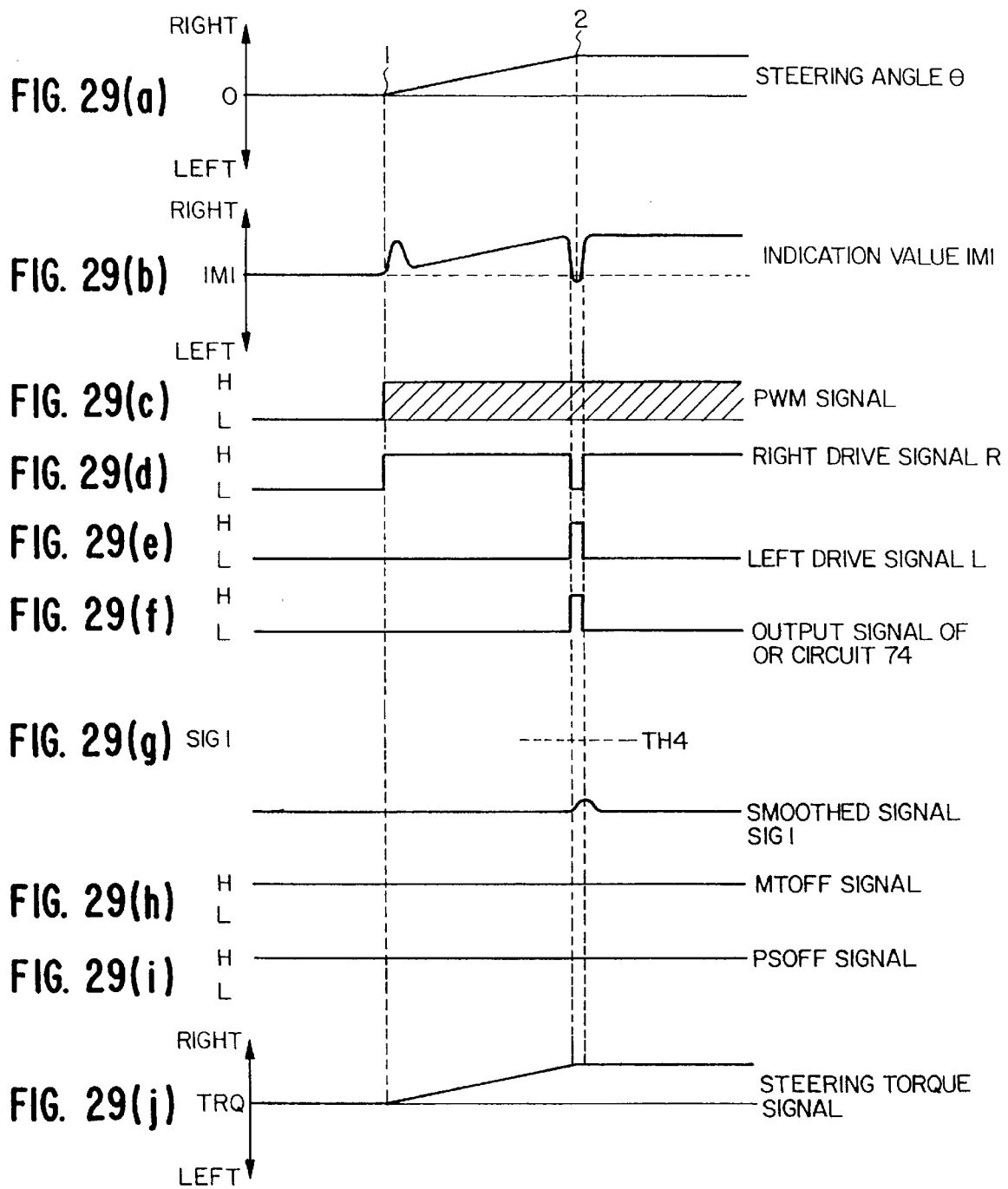

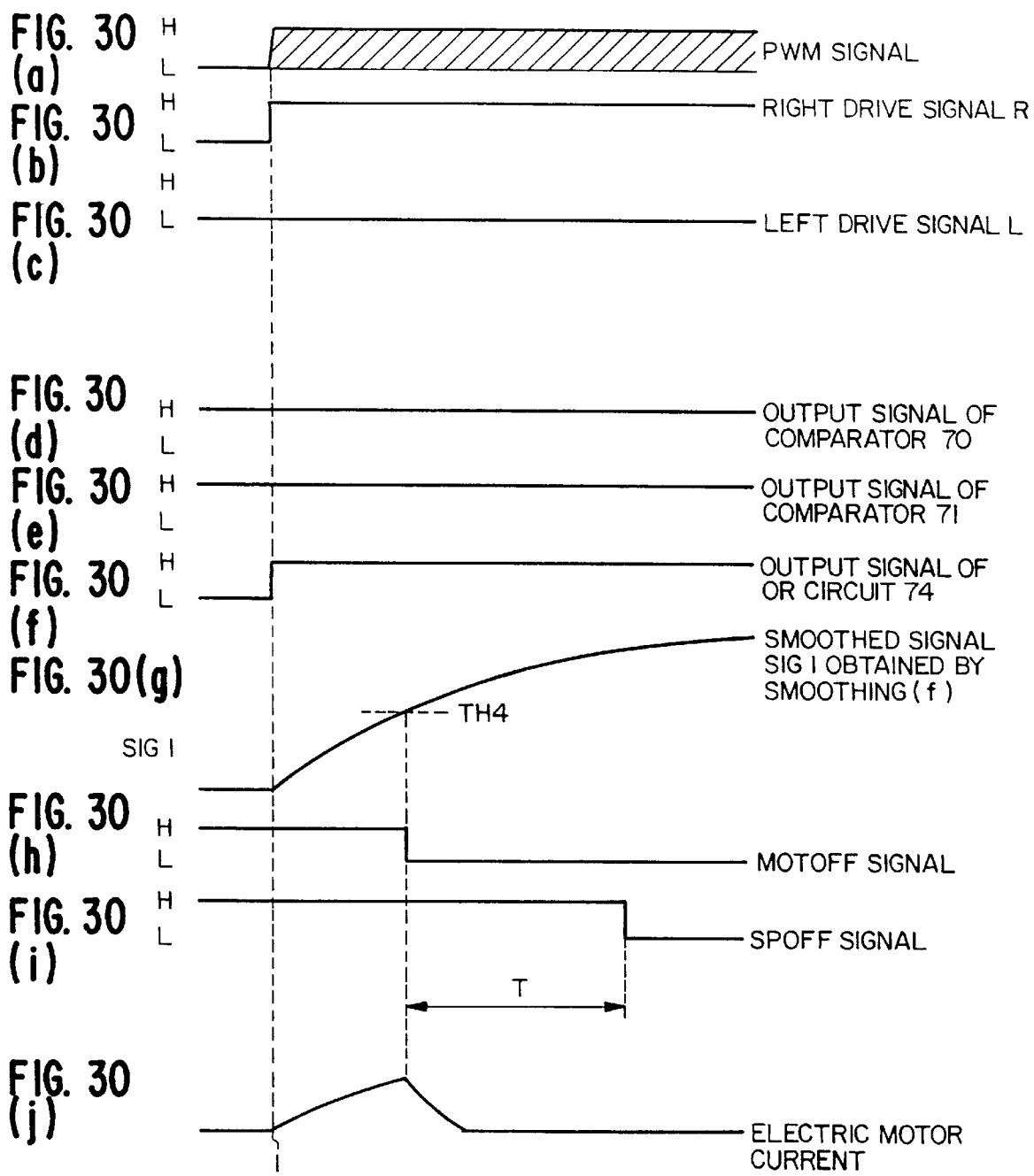

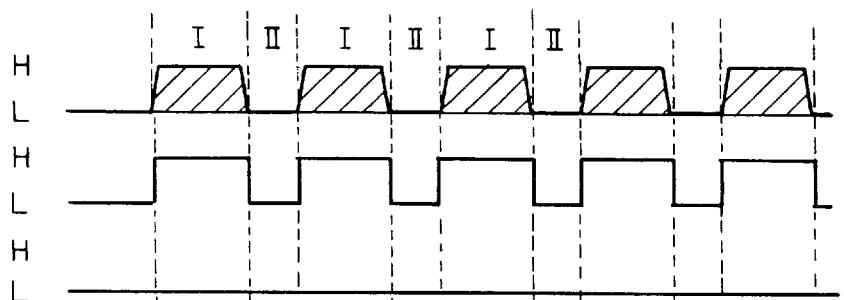
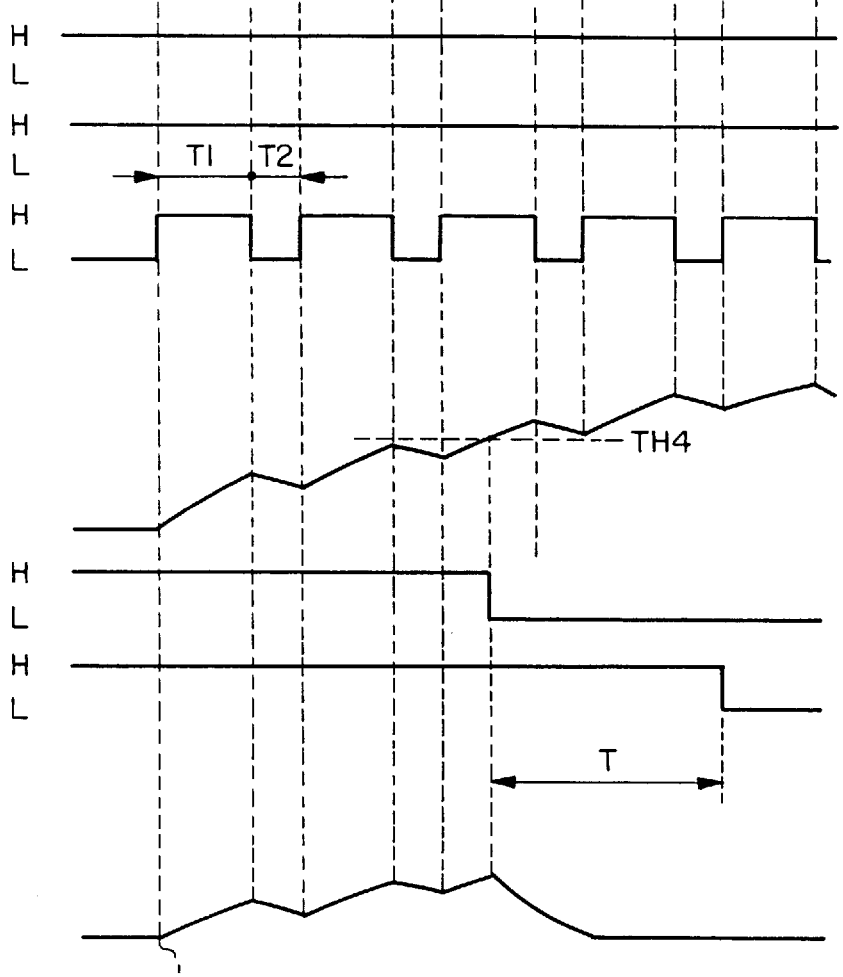

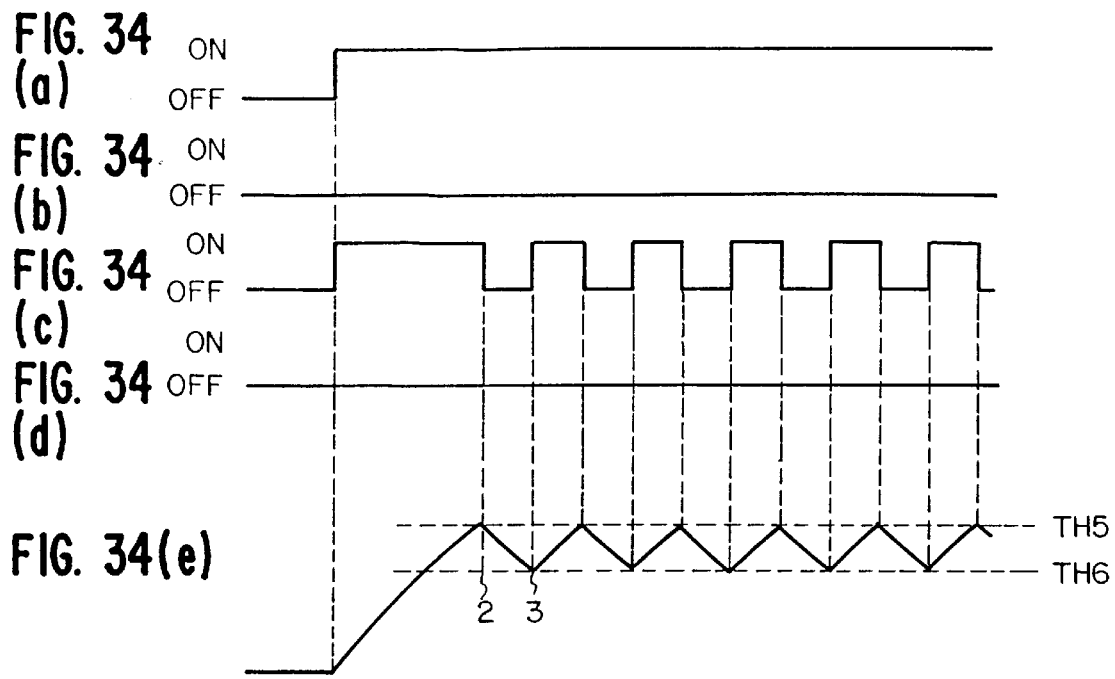
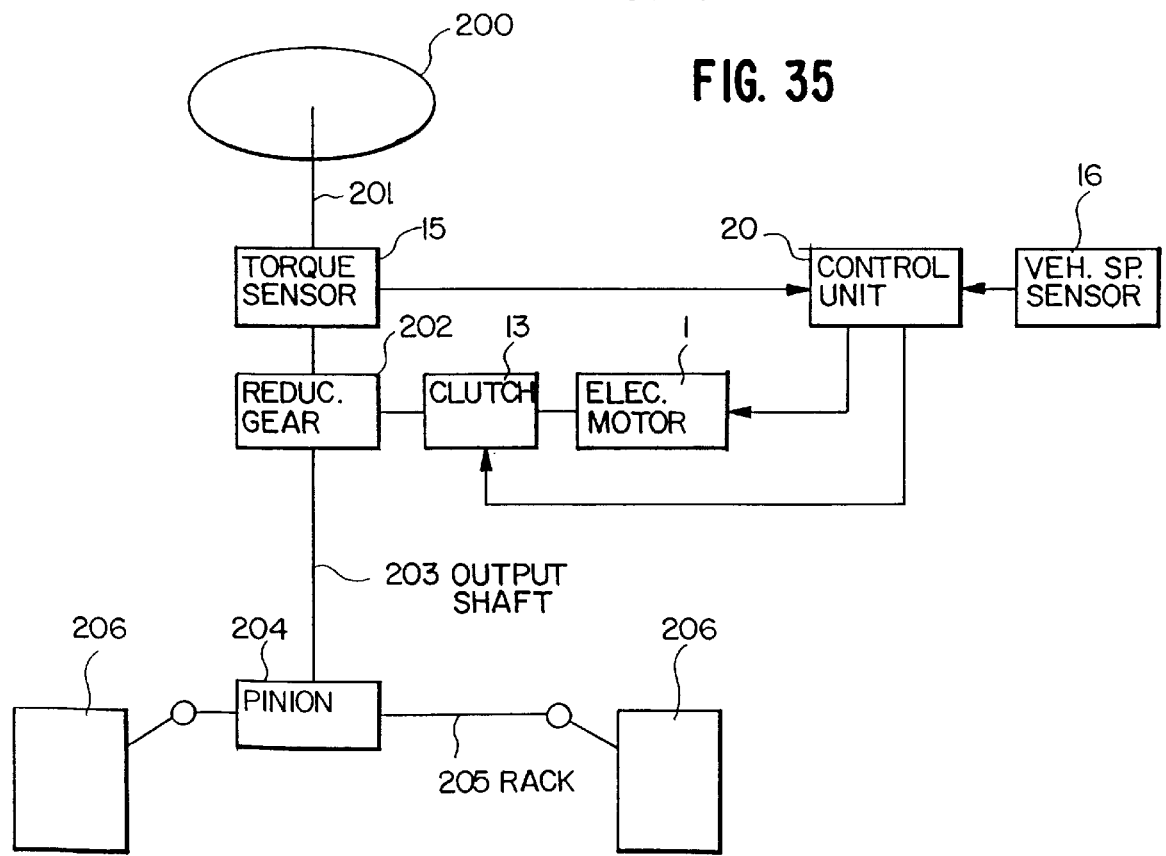
PRIOR ART
FIG. 35

ELECTRIC POWER STEERING CONTROL SYSTEM

This is a divisional of application Ser. No. 08/532,014 filed Sep. 21, 1995, now U.S. Pat. No. 5,839,537, the disclosure of which is incorporated herein by reference.

FIELD OF THE INVENTION

This invention relates to an electric power steering control system with improved motor control performance and steering "feel", without affecting safety.

DESCRIPTION OF THE RELATED ART

FIG. 35 shows a known electric power steering control system for use in an automobile. In this drawing, a torque sensor 15 is disposed on an input shaft 201 of a steering wheel 200, and connected to a control unit 20. A vehicle speed sensor 16 is also connected to the control unit 20, and the current of an electric assist motor 1 is controlled according to torque and vehicle speed. The motor 1 is coupled with an output shaft 203 through a clutch 13 and a reduction gear 202. The clutch 13 is controlled by the control unit 20. When the clutch 13 is engaged, the output shaft 203 and a pinion 204 rotate according to the rotation of the motor 1, thereby driving a rack 205 to move either leftward or rightward, and front wheels 206 connected to the rack are steered. Since the output shaft 203 is also connected to the input shaft 201 through the reduction gear 202, a desirable steering feel is provided. The motor current characteristics are shown in FIG. 7; the electric motor is driven in a direction to reduce the steering power.

Japanese Kokai No. 1-257674 discloses an arrangement wherein torque signal direction judgment means for detecting the steering direction from the steering torque are provided to prevent the motor from being driven in the reverse direction of the steering torque.

By incorporating this technique in the control unit 20 of FIG. 35, an auxiliary steering force against the steering direction is not produced by the motor 1 even if the computer in the control unit 20 malfunctions, thus improving safety.

In an electric power steering control system of such an arrangement, however, since the motor is connected to the steering system, there arise such disadvantages as an increase in inertial mass or an increase in torque loss, thereby deteriorating the steering feel. To improve the steering feel, several attempts such as inertia compensation, torque loss compensation, etc. have been heretofore proposed.

In a control system without inertia compensation, when steering is performed as shown in FIG. 8(a), the motor is not yet caused to rotate at the time ① when the steering is started and therefore steering force is increased by an amount necessary to rotate the motor. Further, at the time ② of the start of the holding state, overshoot which takes place due to inertia of the motor results in deterioration of steering feel. When performing inertia compensation, it is possible to compensate the inertial sensation of the motor by applying a current sufficient to offset the inertia produced when the rotation of the motor is started, as shown in FIG. 8(e) at the time , or by applying a current sufficient to offset the inertia produced when the rotation of the motor is stopped, as shown in FIG. 8(e) at the time ②, thereby improving the steering feel.

In the control system without torque loss compensation, when the steering wheel is returned to neutral without holding the steering wheel after steering right, as shown in FIG. 13(a), the steering wheel is returned to neutral by driving the motor due to a reaction from the road surface. Therefore disadvantages arise of a reduction in the returning speed of the steering wheel corresponding to the torque loss of the motor and the steering wheel not returning to neutral. When performing torque loss compensation, the steering wheel returning performance can be improved by supplying a current to compensate for the torque loss of the motor to the motor at the time the steering wheel is returned, as shown in FIG. 13(e).

As mentioned above, in the conventional inertia compensation and torque loss compensation system, feel is improved by supplying a motor current in the reverse direction of the steering torque. A problem, however, exists in that since the electric motor is inhibited from being driven in the reverse direction of the steering torque, controls such as inertia compensation control and torque loss compensation control are not available, so that steering feel is not sufficiently improved.

SUMMARY OF THE INVENTION

The present invention solves the above-described problems. It is an object of the invention to provide an electric power steering control system in which steering feel is improved, and in which motor control can be performed without affecting safety.

It is another object of the invention to drive the motor in a reverse direction to the steering torque under the condition of a limited motor current.

It is a further object of the invention to improve steering feel by means of inertia compensation control.

It is yet another object of the invention to provide an electric power steering control system wherein dangerous torque is not produced when a current is applied in the reverse direction of the driving torque.

An electric power steering control system according to the invention comprises: steering force detecting means for detecting a steering force; an electric motor for producing an auxiliary steering force; motor current detecting means for detecting a motor current of said electric motor; motor current control means for determining a motor current value and a driving direction of the electric motor required by said electric motor at least in accordance with the steering force detected by said steering force detecting means, thereby controlling the motor current; and motor current limiting means for limiting said motor current in accordance with the steering force detected by said steering force detecting means and the motor current value detected by said motor current detecting means.

An electric power steering control system according to the invention comprises: steering force detecting means for detecting a steering force; an electric motor for producing an auxiliary steering force; a power source for supplying electric power to said electric motor; motor current control means for determining a motor current of said motor current value and a driving direction of the electric motor required by said motor at least in accordance with the steering force detected by said steering force detecting means, thereby controlling the motor current in the form of a pulse width modulation control; a bridge circuit for driving said electric motor; a sample-and-hold circuit for sampling and holding a current between said power source and said bridge circuit or a current between said bridge circuit and the ground synchronously with a pulse width modulation signal; motor current detecting means for detecting a motor current using said sample-and-hold circuit; and abnormal motor current detecting means for detecting an abnormality in the motor current in accordance with a motor current value detected by said motor current detecting means; characterized in that said sample-and-hold circuit is operated so as to perform the detection of motor current even when said electric motor is not operated according to said motor control means.

An electric power steering control system according to the invention comprises: steering force detecting means for detecting a steering force; an electric motor for producing an auxiliary steering force; motor current detecting means for detecting a motor current of said electric motor; motor current control means for determining a motor current target value and a driving direction of the electric motor required by said electric motor at least in accordance with the steering force detected by said steering force detecting means, thereby controlling the motor current; motor current limiting means for comparing said motor current target value with a predetermined value so as to limit said motor current within a predetermined range; and abnormal motor current detecting means for detecting an abnormality in the motor current in accordance with said motor current target value and said detected motor current value; wherein said motor is controlled by said motor control means within a range not subject to limitation by said motor current limiting means, wherein current error does not takes place between the indicated value of motor current and the detected value of motor current as a result of the establishment of a target value of motor current within a range limited by the motor current limiting means.

In addition, in an electric power steering control system comprising motor current detecting means for detecting a motor current using a sample-and-hold circuit, abnormal motor current detecting means for detecting abnormality in the motor current in accordance with the detected motor current value, and motor current limiting means for limiting the motor current in accordance with the steering torque and detected motor current value, since the detection of motor current at the time when the electric motor is not driven becomes possible by turning on the sample-and-hold circuit when the electric motor is not driven, detection of abnormality in the motor current is possible. Furthermore, it is possible to limit the motor current in the reverse direction of the steering torque by the motor current limiting means, resulting in a safer electric power steering control system.

Other objects and advantages of this invention will become apparent from the detailed description given hereinafter. It should be understood, however, that the detailed description and specific embodiment are provided by way of illustration only, and that various changes and modifications within the spirit and scope of the invention will become apparent to the those skilled in the art from this detailed description.

BRIEF DESCRIPTION OF THE DRAWINGS

FIGS. 9(a) to 9(i) are a timing chart to explain the operation of an embodiment of the invention shown in FIG. 1 when the motor current limiting means is abnormal.

FIGS. 10(a) and 10(b) are graphs showing the characteristics of the outputs ILR and ILL of the motor current limiting means other than those shown in FIG. 4 according to an embodiment of the invention.

FIGS. 11(a) and 11(b) are graphs showing the characteristics of the outputs ILR and ILL of the motor current limiting means other than those shown in FIG. 4 according to an embodiment of the invention.

FIG. 19 is a circuit diagram showing one embodiment of the motor current limiting means employed in embodiment 5 of the invention.

FIGS. 29(a) to 29(j) are a timing chart showing the operation of embodiment 8 of the invention.

FIGS. 30(a) to 30(j) are a timing chart showing the operation of the embodiment 8 of the invention.

FIGS. 31(a) to 31(j) are a timing chart showing the operation of embodiment 8 of the invention.

FIGS. 34(a) to 34(e) are a timing chart showing the operation of the embodiment 9 of the invention.

FIG. 35 is a block diagram showing an arrangement of the prior electric power steering control system.

In all figures, elements which are the same or substantially the same have the same reference numbers.

DESCRIPTION OF PREFERRED EMBODIMENTS

Embodiment 1

Figure 1:
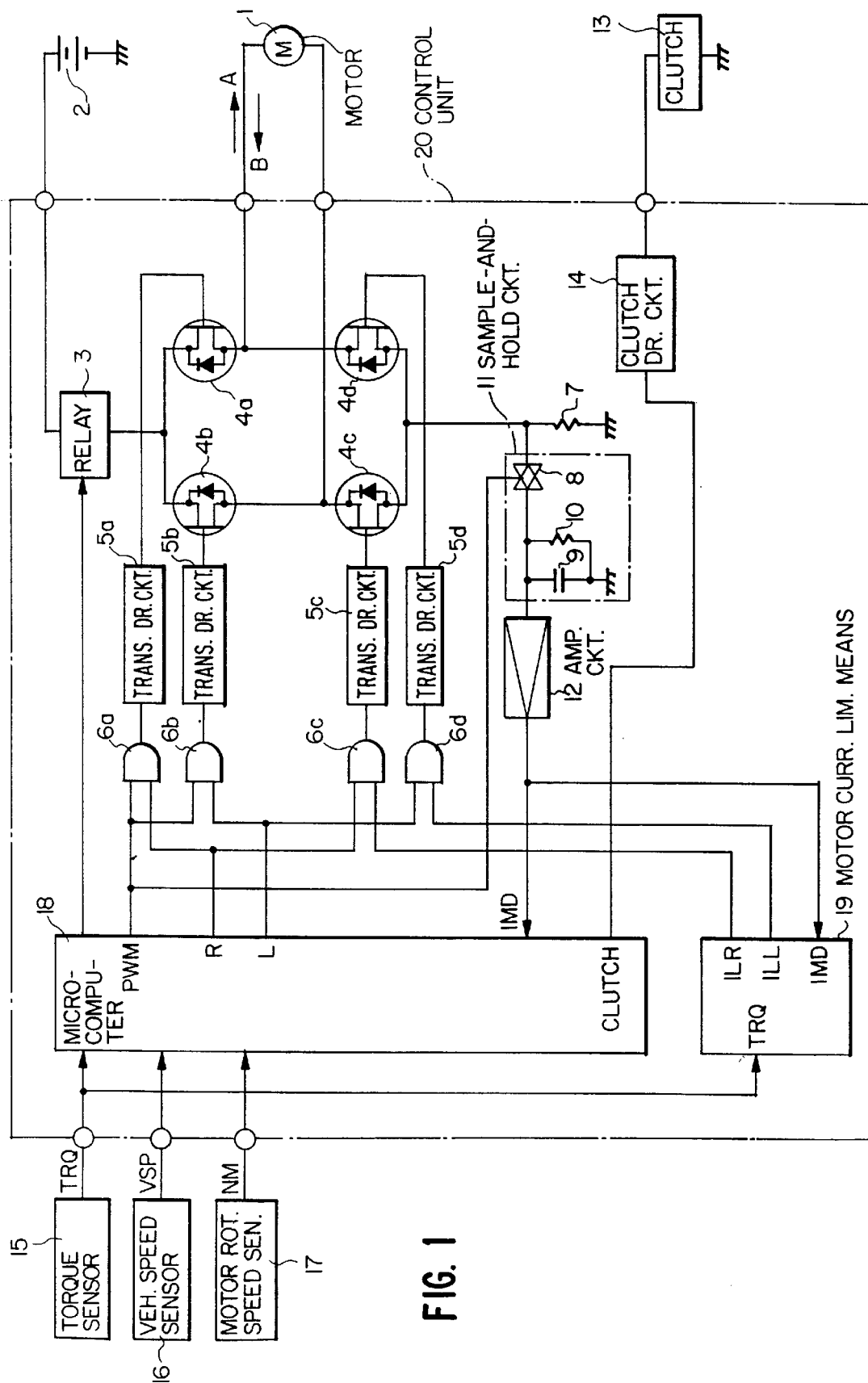
FIG. 1 is a schematic circuit diagram of the electric power steering control system common to embodiments 1, 2, 5, 9 of the invention.

An electric power steering control system incorporated in an automobile according to embodiment 1 of the present invention is hereinafter described with reference to FIGS. 1 to 11. This embodiment relates to a manner of steering. An electric power steering control system shown in FIG. 1 has an electric motor 1 for producing an auxiliary steering force; a battery 2 for supplying power to the electric motor 1; a relay 3; transistors 4a–4d constituting a bridge arrangement for driving the electric motor 1; transistor drive circuits 5a–5d for respectively driving the transistors 4a–4d; AND circuits 6a–6d; a shunt resistor 7 for detecting a motor current; an analog switch 8 for turning on when a pulse width modulation (hereinafter referred to as PWM) signal is high and turning off when the PWM signal is low; a capacitor 9 for holding a voltage when the analog switch 8 is turned on; a resistor 10 for discharging an electric charge from the capacitor 9 in conformity with the time constant of the motor 1; a sample-and-hold circuit 11 comprising the analog switch 8, capacitor 9 and resistor 10; an amplifier circuit 12 for amplifying signals from the sample-and-hold circuit 11; a clutch 13 for mechanically connecting or disconnecting the motor 1 and the steering system; a clutch drive circuit 14 for driving the clutch 13; a torque sensor 15 for detecting a steering torque; a vehicle speed sensor 16 for detecting vehicle speed; a motor rotation speed sensor 17 for detecting rotation speed of the motor 1; a microcomputer 18 serving as motor control means for controlling the motor current in accordance with signals from the torque sensor 15, vehicle speed sensor 16 and motor rotation speed sensor 17; motor current limiting means 19 for limiting the motor current in accordance with the steering torque signal TRQ of the torque sensor and the motor current detection signal IMD; and a control unit 20 for the electric power steering control system.

Figure 2:
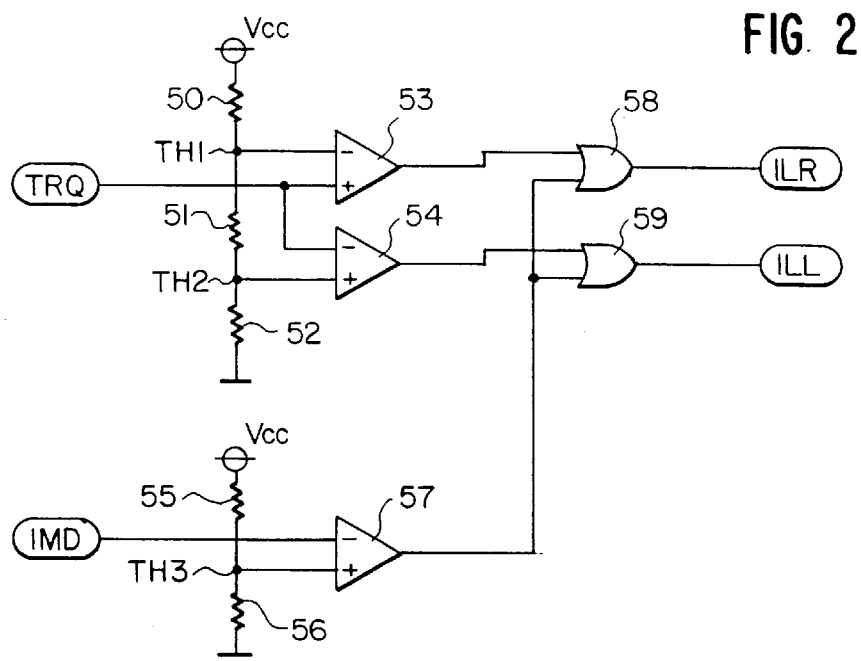
FIG. 2 is a detailed circuit diagram of the motor current limiting means according to embodiment 1 of the invention shown in FIG. 1.

The motor current limiting means 19, which are now described with reference to FIG. 2, comprises a 5 V power source Vcc, resistors 50, 51, 52, 55, 56, comparators 53, 54, 57, and OR circuits 58 and 59, wherein threshold values TH1 and TH2 are decided and compared with the input torque signal TRQ by comparators 53 and 54. A threshold value TH3 is decided and compared with the input detected motor current value IMD by a comparator 57.

Figure 3:
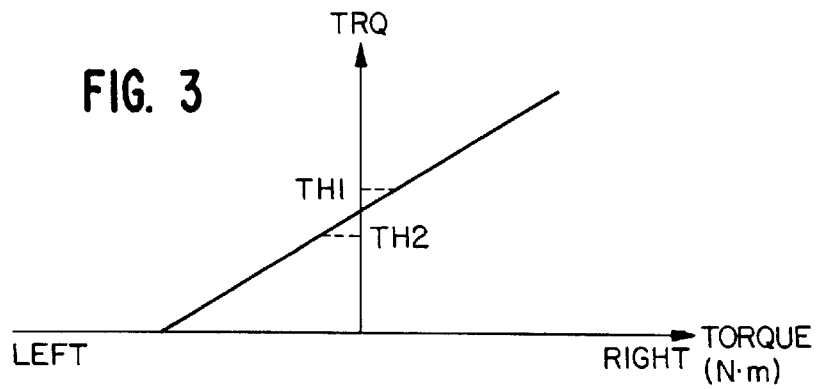
FIG. 3 is a graph showing the characteristic of the torque sensor 15 according to an embodiment of the invention shown in FIG. 1.
Figure 4A:
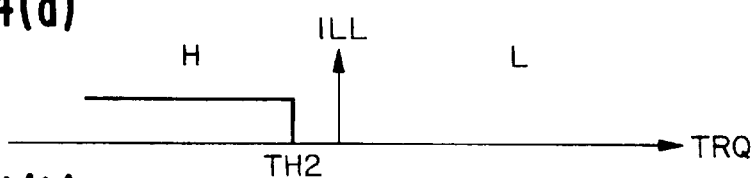
FIG. 4 is a graph showing the characteristic of the outputs ILL and ILR of the motor current limiting means according to the embodiment of the invention shown in FIG. 2.
Figure 4B:
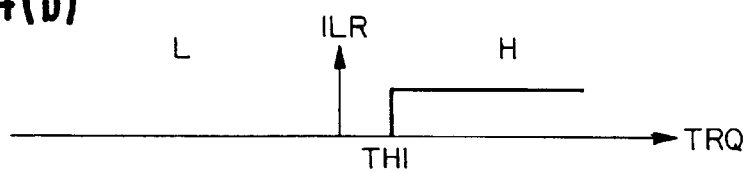

The steering torque signal TRQ of the torque sensor 15 has a characteristic corresponding to the steering torque as shown in FIG. 3. The output of the comparator 53 is high when the steering torque signal TRQ is higher than the predetermined value TH1 (a right torque of 1N·m, for example), and the output of the comparator 53 is low when the steering torque TRQ is less than the predetermined value TH1.

On the other hand, the output of comparator 54 is high when the steering torque signal TRQ is less than the predetermined value TH2 (a left torque of 1N·m, for example), and the output of comparator 54 is low when the steering torque TRQ is greater than the predetermined value TH2.

Further, the comparator 57 compares the detected motor current value IMD with a predetermined value TH3, and the output of comparator 57 is high when IMD is less than TH3 (under 3A, for example), and the output of comparator 57 is low when the detected motor current value is greater than the predetermined value TH3. As the comparators 53, 54 and 57 are connected to the OR circuits 58, 59, the outputs ILL, ILR are both high when the detected motor current value IMD is under the predetermined value TH3, and the outputs ILL and ILR are high or low as a result of comparison with the predetermined values TH1 and TH2 as respectively shown in FIG. 4(a) and FIG. 4(b) when the detected motor current value IMD is over the predetermined value TH3.

Operation of the control unit 20 of the electric power steering control system is hereinafter described. In the rightward drive, a PWM signal for PWM drive of the motor 1 is output from a PWM port of the microcomputer 18. When the port R is high, port L is low, output ILR of the motor current limiting means 19 is high and ILL is low, the transistor 4a is in the PWM operation, the transistor 4b is off, transistor 4c is on, and transistor 4d is off, whereby a current passes in the direction A through the motor 1 and a rightward auxiliary force is produced.

On the other hand, in the leftward drive, when the port R is low, port L is high, output ILR of the motor current limiting means 19 is low and ILL is high, the transistor 4a is off, the transistor 4b is in the PWM operation, transistor 4c is off, and transistor 4d is on, whereby a current flows in the direction B in the motor 1 and a leftward auxiliary force is produced.

Further, when the detected motor current value IMD is greater than the predetermined value TH3, the signals ILR, ILL from the AND circuits 6c, 6d and the motor current limiting means 19 are low, whereby the transistors 4c, 4d cannot drive the motor in the reverse direction of the steering torque.

Figures 5A, 5B, 5C, 5D, 5E, 5F, 5G, 5H, 5I:
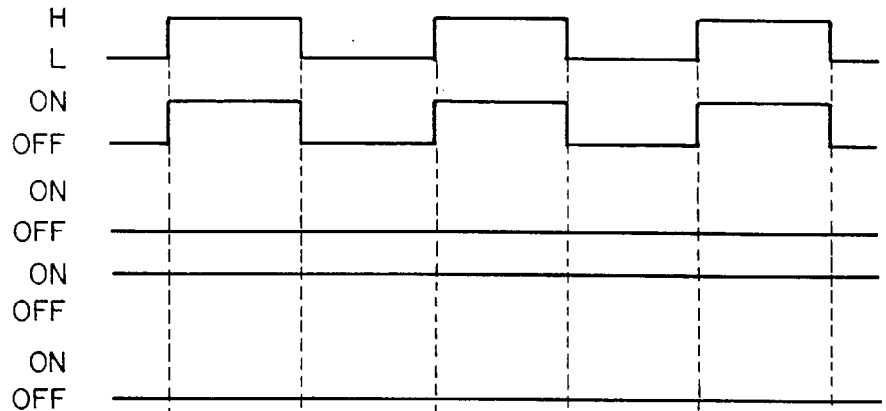
FIGS. 5(a) to 5(i) are a timing chart to explain the operation of the motor current detecting means according to an embodiment of the invention shown in FIG. 1.

Operation of the sample-and-hold circuit 11 for detecting the motor current is hereinafter described with reference to FIG. 5, taking the rightward drive of the electric motor as an example. In this driving operation, the port R is high, port L is low, output ILR of the motor current limiting means 19 is high and output ILL is low. In FIG. 5, (a) denotes a PWM signal, (b) denotes an operation waveform of the transistor 4a, (c) denotes an operation waveform of the transistor 4b, (d) denotes an operation waveform of the transistor 4c, and (e) denotes an operation waveform of the transistor 4d. During the period I when the transistors 4a, 4c are on and 4b, 4d are off, a current passes from the battery 2 to the ground through the relay 3, transistor 4a, motor 1, transistor 4c and shunt resistor 7, and during the period II when the transistors 4a, 4b, 4d are off and 4c is on, a flywheel current passes in the direction A from the motor 1 to the motor 1 through diodes incorporated in the transistors 4c, 4d by inductance of the motor 1, so that the motor current waveform is as shown in FIG. 5(f).

During the period I a motor current passes through the shunt resistor 7, and during the period II no motor current passes therethrough, and as a result, a waveform detected by the shunt resistor 7 is as shown in FIG. 5(g). The analog switch 8 is turned on/off at the timing shown in FIG. 5(h) corresponding to the PWM signal. During the period I when the analog switch 8 is on, the capacitor 9 is charged with a voltage detected by the shunt resistor 7, and during the period II when the analog switch 8 is off, the electric charge charged during the period I is discharged through the resistor 10 resulting in a waveform as shown in FIG. 5(i). A signal corresponding to the motor current can be obtained by establishing a discharge time constant so that the discharge waveform ② at this time may be equal to ① of the motor current waveform (f).

Figure 6:
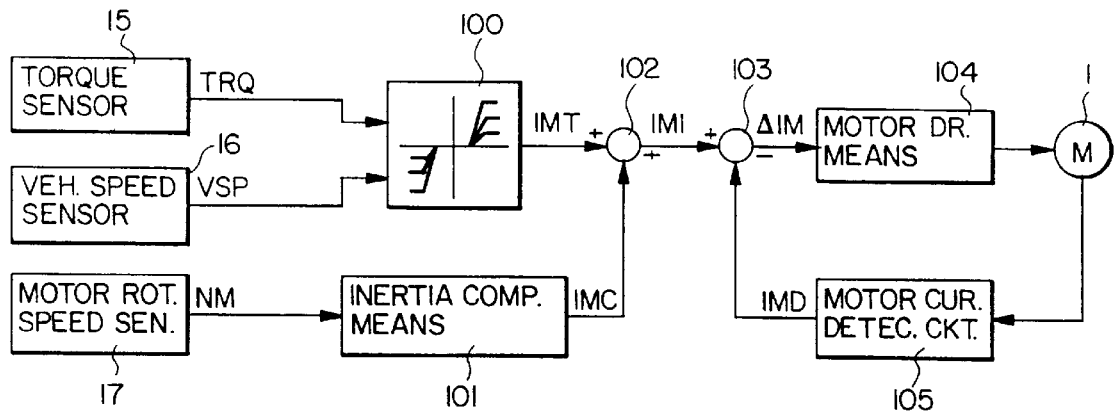
FIG. 6 is a control block diagram showing the control of the electric power steering control system according to an embodiment of the invention shown in FIG. 1.
Figure 7:
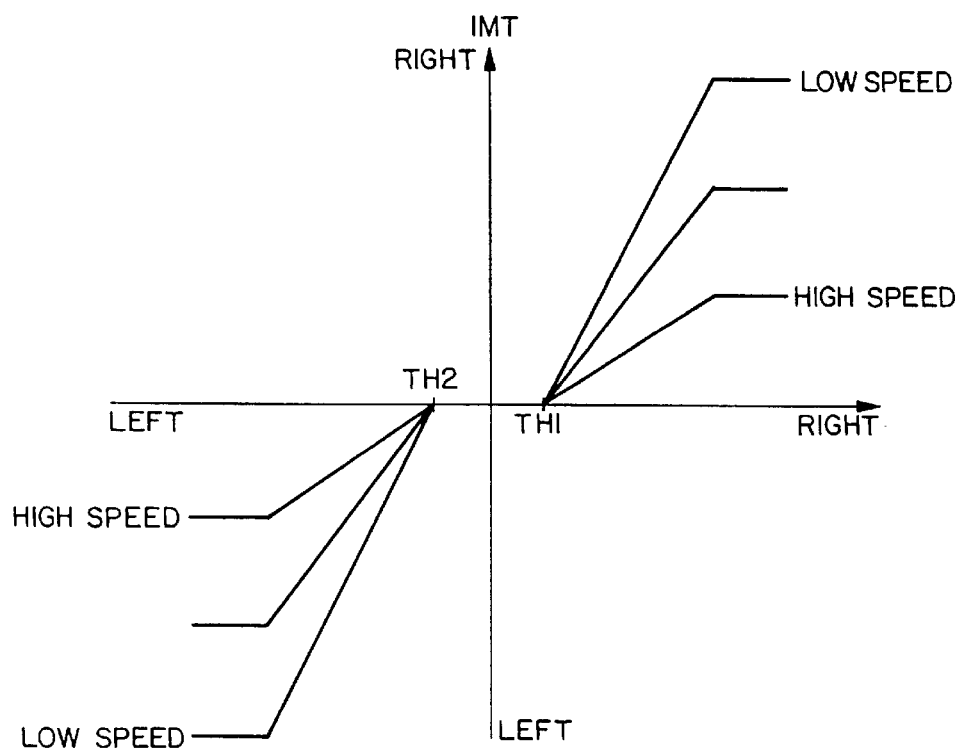
FIG. 7 is a graph showing the motor current characteristic to explain the output of the target current deciding means according to an embodiment of the invention.
Figure 8A:
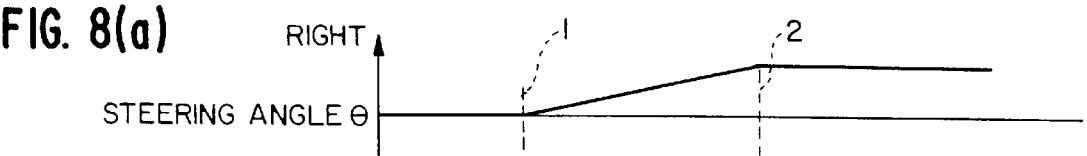
FIG. 8 is a waveform diagram to explain the electric power steering operation provided with inertia compensation control according to an embodiment of the invention shown in FIG. 1.
Figure 8B:
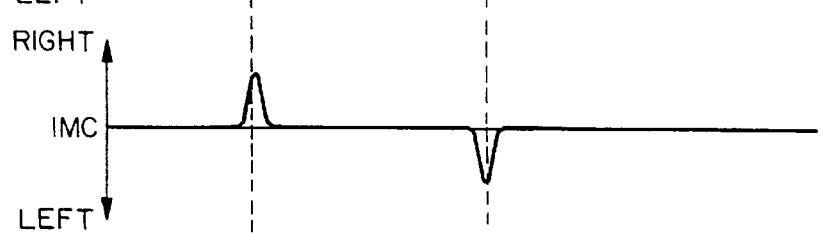
Figure 8C:
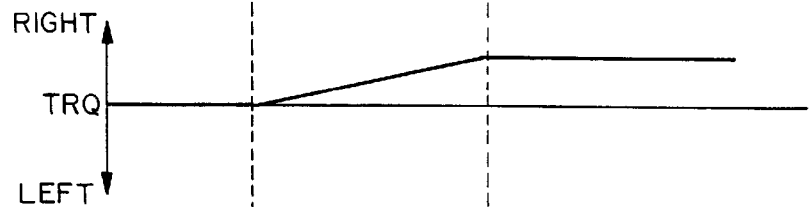
Figure 8D:
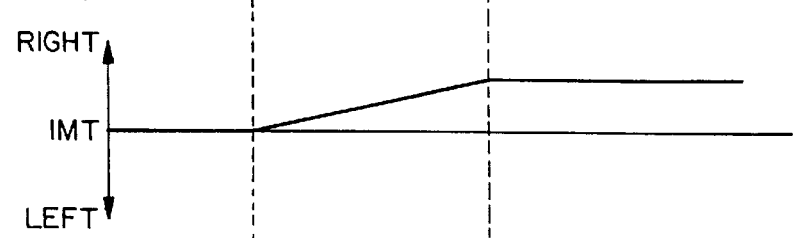
Figure 8E:
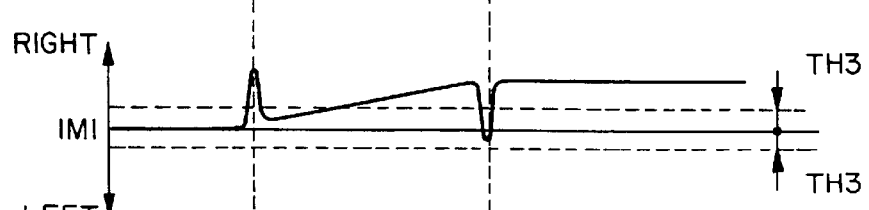
Figure 8F:
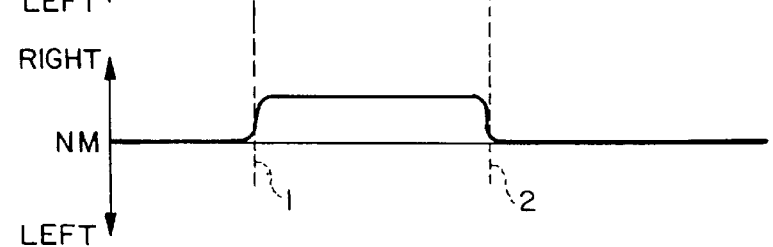

The control manner of the system shown in FIG. 1 is hereinafter described with reference to FIG. 6. The steering torque TRQ is detected by the torque sensor 15, the vehicle speed VSP is detected by the vehicle speed sensor 16, and the target value IMT of the motor current is decided by the target current deciding means 100. Input characteristics of the target current deciding means 100 are shown in FIG. 7, in which current is caused to pass so as to produce a rightward auxiliary force when producing a rightward torque, while current is caused to pass so as to produce a leftward auxiliary force when producing a leftward torque.

The motor current is also changed depending upon the vehicle speed so as to produce an auxiliary steering force corresponding to the vehicle speed. Further, a motor rotation speed signal NM is detected from the motor rotation speed sensor 17, a current IMC for the inertia compensation is decided by the inertia compensation means 101, and an indicated value IMI of the motor current is obtained by adding the motor current target value IMT and the inertia compensation current IMC in an adder 102. In subtractor 103, a deviation ΔIM between the indicated value IMI of the motor current and the detected motor current value IMD detected by the motor current detecting circuit 105 is obtained, and a control is performed by the motor drive means 104 so that ΔIM may be zero.

Operation when the steering wheel is steered rightward is hereinafter described with reference to the timing chart in FIG. 8. In the drawing, (a) denotes a steering angle θ of the steering wheel, (b) denotes a current IMC for compensating the inertia component of the electric motor 1 by the inertia compensation means, (c) denotes a steering torque TRQ, (d) denotes a target value IMT of the motor current decided by the steering torque TRQ and the vehicle speed VSP, (e) denotes a motor current indicated value IMI obtained by adding the motor current target value IMT and the inertia compensation current IMC, and (f) denotes a rotation speed NM of the electric motor.

In this embodiment, inertia of the electric motor 1 is compensated by proportioning the inertia compensation current IMC to a parameter of the motor rotation speed NM, and the inertia feeling is reduced by applying respectively a current for compensating a starting torque of the electric motor at the moment ① and a current for compensating a torque for stopping the electric motor at the moment ②. Though the direction is opposite to that of the steering torque at the moment ②, the current for compensating the inertia of the motor 1 is under the threshold value TH3 (3A, for example) and, therefore, the current is not subject to limitation by the motor current limiting means 19.

A state in which something abnormal takes place in the microcomputer 18 and the motor is driven irrespective of the steering torque is hereinafter described with reference to FIG. 9. This drawing shows a state in which the microcomputer 18 malfunctions so as to drive the motor rightwardly at the moment ① when the steering torque is neutral, and in which (a) denotes operation of the transistor 4a, (b) denotes operation of the transistor 4b, (c) denotes operation of the transistor 4c, (d) denotes operation of the transistor 4d, (e) denotes a motor current, (f) denotes an output of the comparator 53, (g) denotes an output of the comparator 54, (h) denotes an output of the comparator 57, and (i) denotes a rightward drive inhibit signal ILR and a leftward drive inhibit signal ILL of the motor current limiting means 19. When the microcomputer 18 malfunctions and a current starts to flow into the motor, the motor current is increased according to the time constant of the motor. When the motor current becomes greater than the predetermined value TH3, the output of comparator 57 is low, the outputs ILR, ILL of the motor current limiting means are low, and the transistor 4c is off. When the transistor 4c is off, the motor current is decreased, and when the motor current is under the predetermined value TH3, the output of the comparator 57 is again high, the rightward drive inhibit ILR and leftward drive inhibit ILL are also high, whereby the transistor 4c is on and the motor current is increased. As the mentioned operations are repeated, the motor current is limited at the predetermined value TH3. The same operations take place when driving the motor in reverse direction of the steering direction.

As described above, in embodiment 1, since the motor current for producing the auxiliary force in the reverse direction of the steering torque can be applied when the detected motor current value IMD is less than the predetermined value TH3, it is possible to improve steering feel by the inertia compensation means. On the other hand, since the motor current is limited when the detected motor current value IMD is greater than the predetermined value TH3, the motor current is limited to be less than the predetermined value TH3 even when the microcomputer 18 is out of order and the motor is driven irrespective of the steering torque. The predetermined value TH3 is a current value (3A, for example) large enough to compensate for the inertia of the motor 1, but not so large current as to bring about a rotation of the steering wheel. Therefore, there is no danger even when motor current flows in a direction which opposes the steering operation. In other words, steering feel can be improved without negatively affecting safety.

The same advantage as above can be achieved even when, in the characteristic of the motor current limiting means 19, the threshold value TH1 is in the region left of neutral and the threshold value TH2 is in the region right of neutral as shown in FIG. 10, or when both threshold values TH1 and TH2 are neutral as shown in FIG. 11.

Embodiment 2

Figure 12:
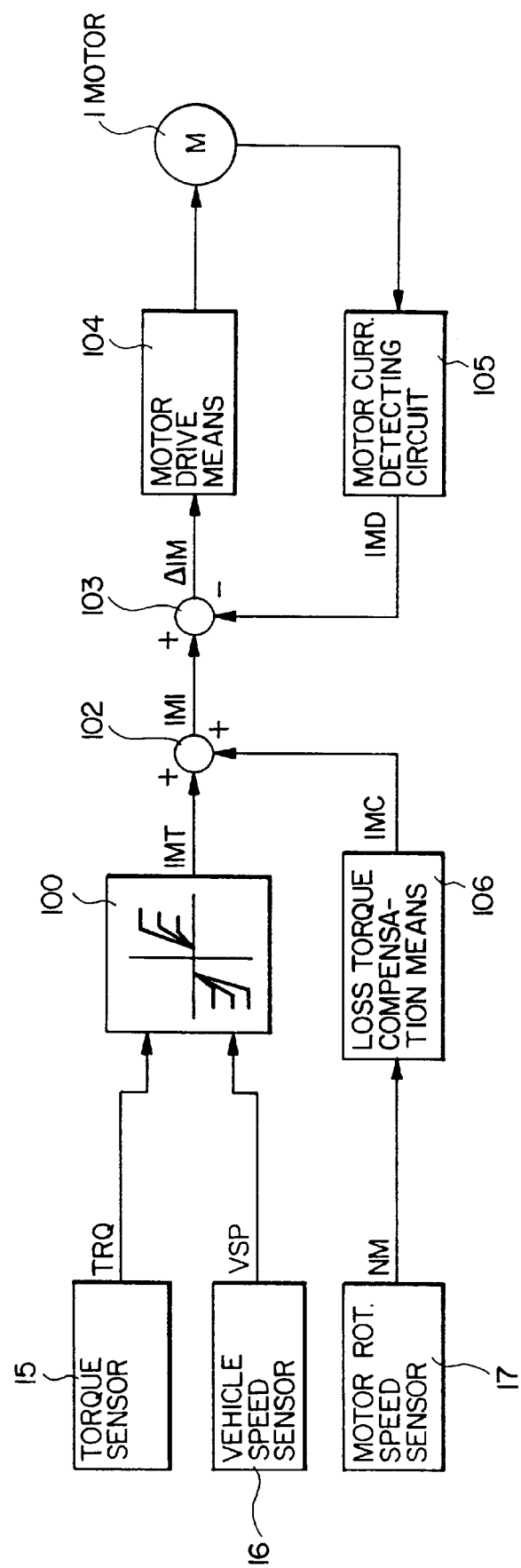
FIG. 12 is a control block diagram of the electric power steering having torque loss compensation according to embodiment 2 of the invention.
Figure 13A:
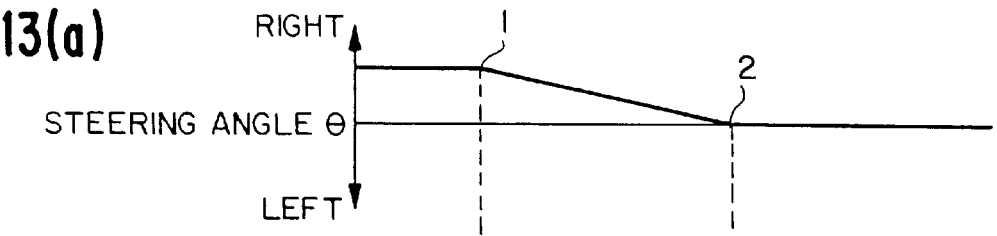
FIGS. 13(a) to 13(f) are a timing chart to explain the operation of the electric power steering provided with torque loss compensation according to embodiment 2 of the invention shown in FIG. 12.
Figure 13B:
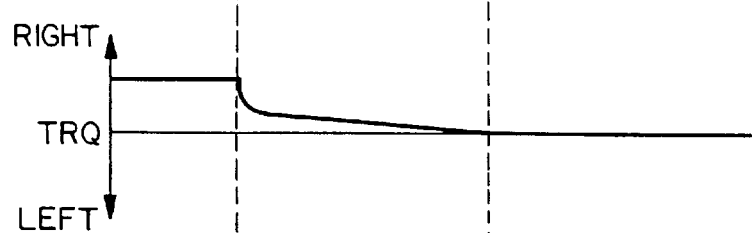
Figure 13C:
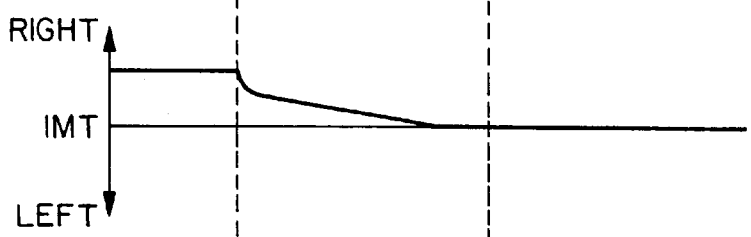
Figure 13D:
Figure 13E:
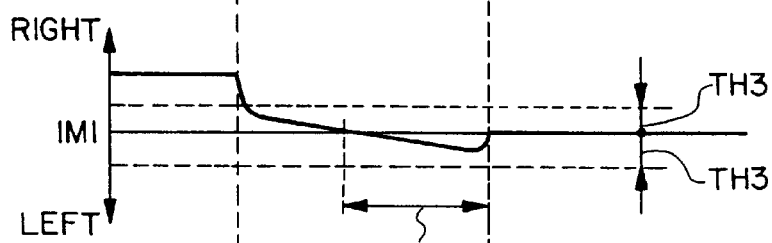
Figure 13F:
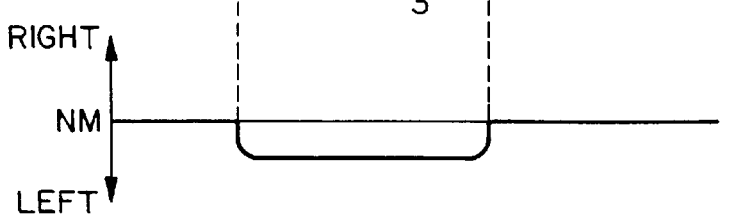

Now an embodiment which is useful at the time of returning the steering wheel to the neutral is hereinafter described as embodiment 2. In embodiment 2, the inertia compensation means 101 of embodiment 1 shown in FIG. 6 is replaced with a torque loss compensation means 106, of which a control block diagram is shown in FIG. 12. The remaining parts are the same as embodiment 1 and therefore a further description is omitted herein.

Operation at the time of returning the steering angle to neutral without holding the steering wheel after steering right during driving is hereinafter described with reference to FIG. 13. In the drawing, (a) indicates that a state without holding the steering wheel comes at the moment ① with a steering angle θ of the steering wheel, and that the steering angle then comes to neutral at the moment ②, (b) indicates a steering torque corresponding to the time shown in (a); (c) indicates a target value IMT of the motor current corresponding to the steering torque TRQ; (d) indicates a current IMC for compensating the torque loss of the electric motor; (e) indicates an indicated value IMI of the motor current obtained by adding the motor current target value IMT and the torque loss compensation current IMC; and (f) indicates a motor rotation speed NM.

The torque loss compensation means 106 compensates the torque loss of the motor by supplying a current corresponding to the rotation speed NM of the electric motor in the rotational direction of the electric motor. It is certain that the motor current is caused to flow in the reverse direction of the steering torque during the time ③, but since the application of current in reverse direction of the steering torque is possible so long as the motor current is under the predetermined value TH3, it is possible to cause such a motor current to flow.

As described above, in embodiment 2, since the motor current for producing the auxiliary force in the reverse direction of the steering torque can be applied when the detected motor current value IMD is less than the predetermined value TH3, it is possible to improve the characteristic of returning the steering wheel by the torque loss compensation means. On the other hand, since no motor current is caused to flow in the reverse direction of the steering torque when the detected motor current value IMD is greater than the predetermined value TH3, the motor current is limited to be less than the predetermined value TH3 even when the microcomputer 18, etc. is out of order. The predetermined value TH3 is a current value (3A, for example) large enough to compensate the torque loss of the motor 1, but not so large as to bring about a rotation of the steering wheel. Therefore there is no danger even when motor current flows in a direction which opposes the steering operation. In other words, steering feel can be improved without negatively affecting safety.

Embodiment 3

Figure 14:
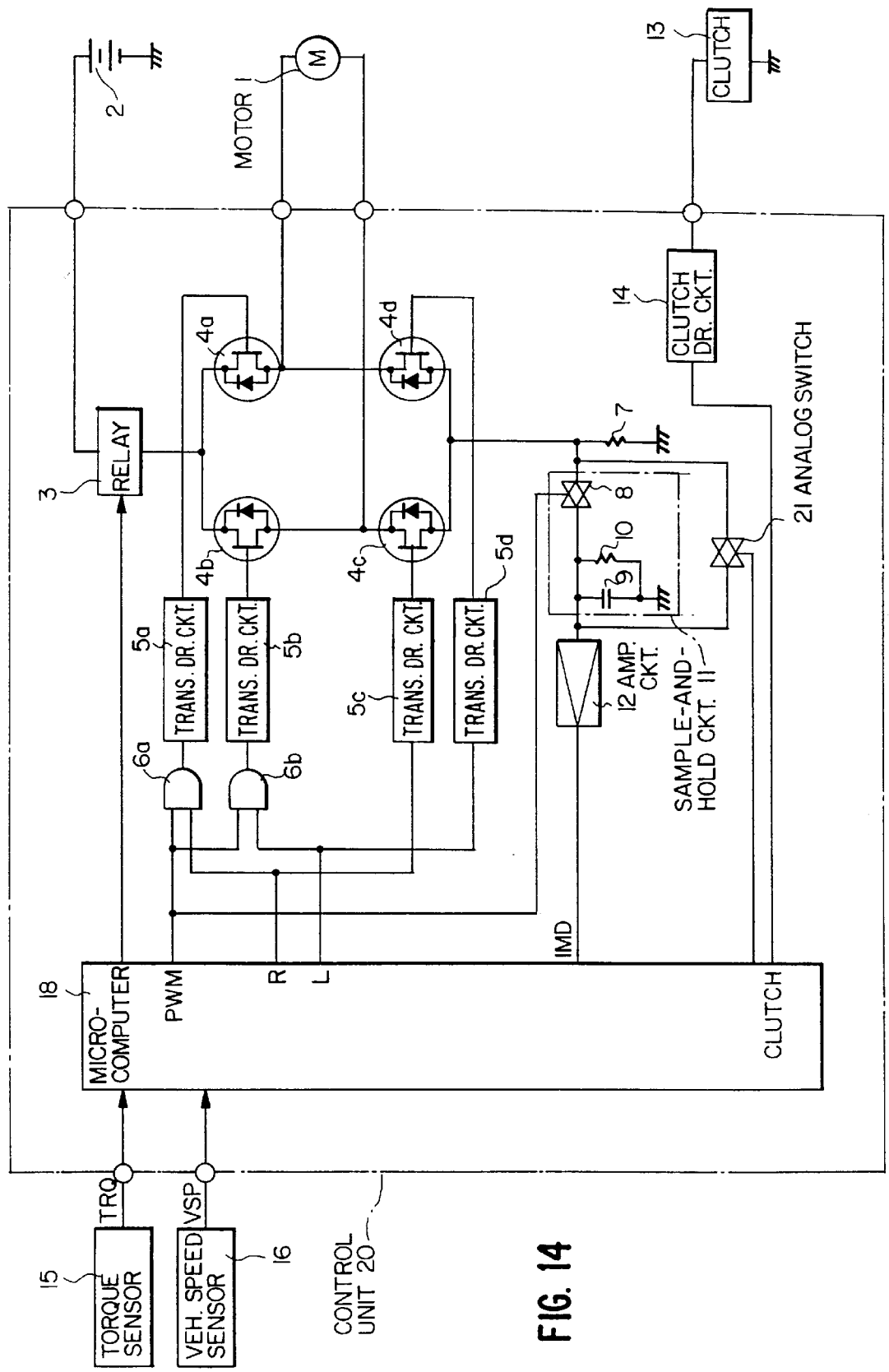
FIG. 14 is a schematic circuit diagram showing the control unit of the electric power steering control system according to embodiment 3 of the invention.

Embodiment 3 is hereinafter described with reference to FIG. 14 which shows a circuit diagram of the control unit of the electric power steering control system. In FIG. 14, reference numeral 21 denotes an analog switch for turning on or off an electrical connection between the input and output of the sample-and-hold circuit 11, the on/off operation being controlled by the microcomputer 18. The remaining parts are the same as FIG. 1 and therefore a further description is omitted herein.

Figure 15:
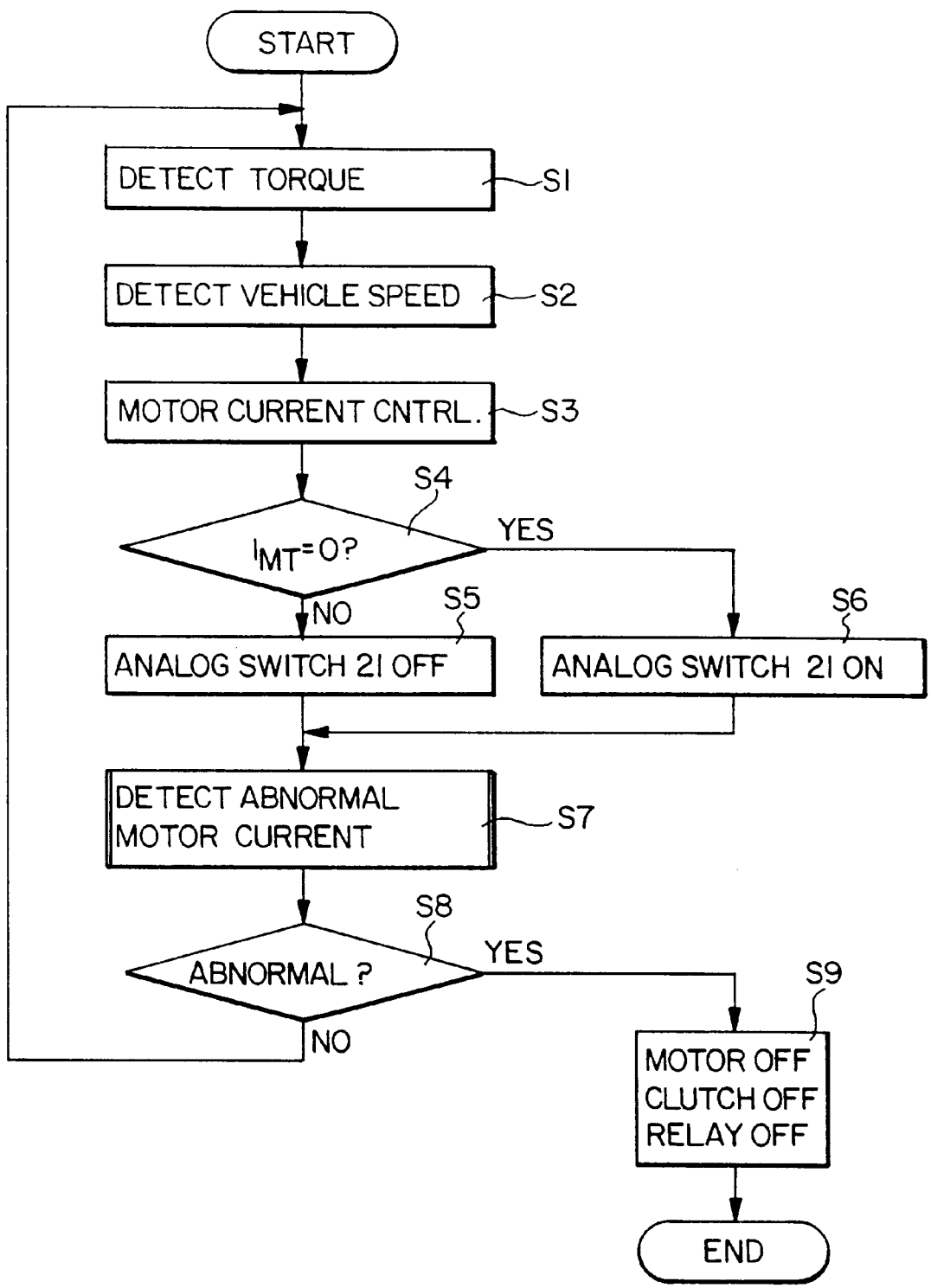
FIG. 15 is a flow chart to explain the control according to embodiment 3 of the invention shown in FIG. 14.

Operation of the microcomputer 18 according to embodiment 3 of the invention shown in FIG. 14 is hereinafter described with reference to the flow chart shown in FIG. 15. A steering torque signal TRQ detected by the torque sensor 15 is applied to the microcomputer 18 in step S1, and then a vehicle speed signal VSP detected by the vehicle speed sensor 16 is applied to the microcomputer 18 in next step S2. In step S3, the microcomputer 18 decides a target value IMT of the motor current in accordance with the characteristic shown in FIG. 7 based on the steering torque signal TRQ and the vehicle speed signal VSP applied thereto, and performs a PWM control of the motor current so that the value IMD detected by the motor current detecting value is equal to the target value IMT. In step S4, it is judged whether or not the target value of the motor current is zero, and if it is judged zero (YES), the flow advances to step S6 to turn on the analog switch 21; if the target value IMT of the motor current is judged other than zero (NO), the flow advances to step S5 to turn of f the analog switch 21. In this manner, detection of the motor current is possible at all times through steps S4, S5, S6. In step S7, detection of abnormality in the motor current is performed, and further in step S8, it is judged whether or not such an abnormality is detected. When there is no abnormality, the flow branches from step S8 to step S1 to repeat the processing.

Figure 16:
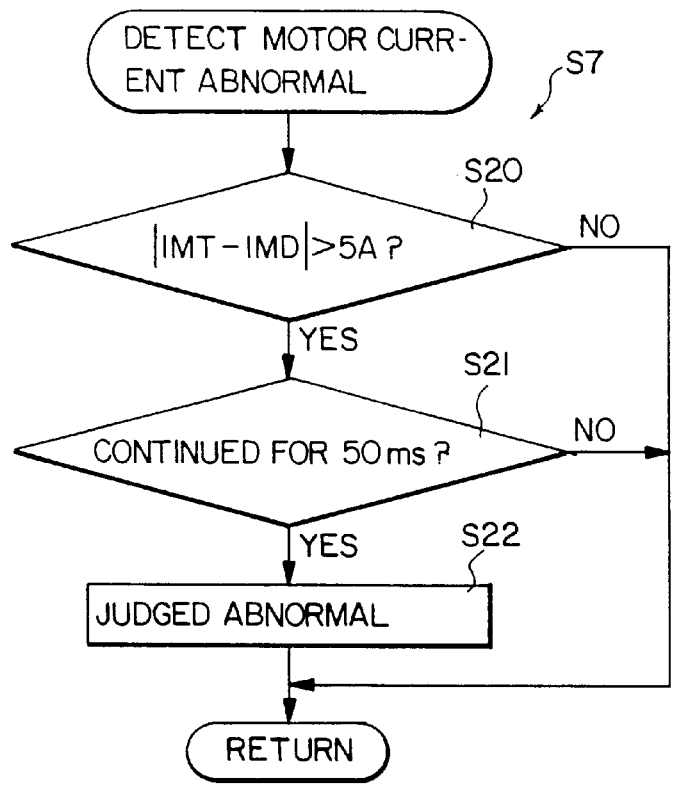
FIG. 16 is a flow chart showing the abnormal motor current detection processing according to embodiment 3 of the invention shown in FIG. 14.

On the other hand, if an abnormality in the motor current is detected, the flow branches from step S8 to step S9 and the microcomputer 18 turns off the motor 1, clutch 13 and relay 3 shown in FIG. 14, whereby processing for stopping the power steering control is performed. The processing flow chart of the abnormal motor current in step S7 of FIG. 15 is hereinafter described with reference to FIG. 16. In FIG. 16, which shows the abnormal motor current detecting step S7, it is judged in step S20 whether or not the absolute value of the difference between the target value IMT of the motor current and the detected value IMD of the motor current is greater than a predetermined value (5A, for example), and if it is judged YES, it is further judged in step S21 whether or not the state has continued for a predetermined time (50 ms, for example). If the state is judged continuous (YES), the motor current is judged abnormal in step S22. If it is judged NO in either of steps S20 and S21, the motor current is considered normal and the flow advances to the next step.

In this embodiment, the analog switch 21 is turned on when the motor is off when PWM signal is low and the analog switch 8 of the sample-and-hold circuit 11 is off, i.e., when the motor 1 is not driven, whereby the section of sample-and-hold circuit 11 is turned on, making it possible to detect abnormality in the motor current as in step S7.

Embodiment 4

Embodiment 4 of the invention is an example of a safety improvement against trouble in or failure of the transistor drive circuits 5a to 5d and the AND circuits 6a, 6b shown in FIG. 1, and is hereinafter described with reference to FIG. 17. This drawing shows a motor current limiting means 19, NOT circuits 22, 25 and transistors 23, 24, 26, 27 respectively added to FIG. 14 showing the foregoing embodiment 3, and in which the transistors 23, 24 are turned on to forcedly turn off the transistors 4a, 4c when the rightward drive inhibit signal ILR for inhibiting the rightward drive of the electric motor is low. Further, the transistors 26, 27 are turned on to forcedly turn off the transistors 4b, 4d when the leftward drive inhibit signal ILL for inhibiting the leftward drive of the motor is low. In addition, the processing manner is the same as that of the foregoing embodiment 3 and therefore its description is omitted.

Figure 17:
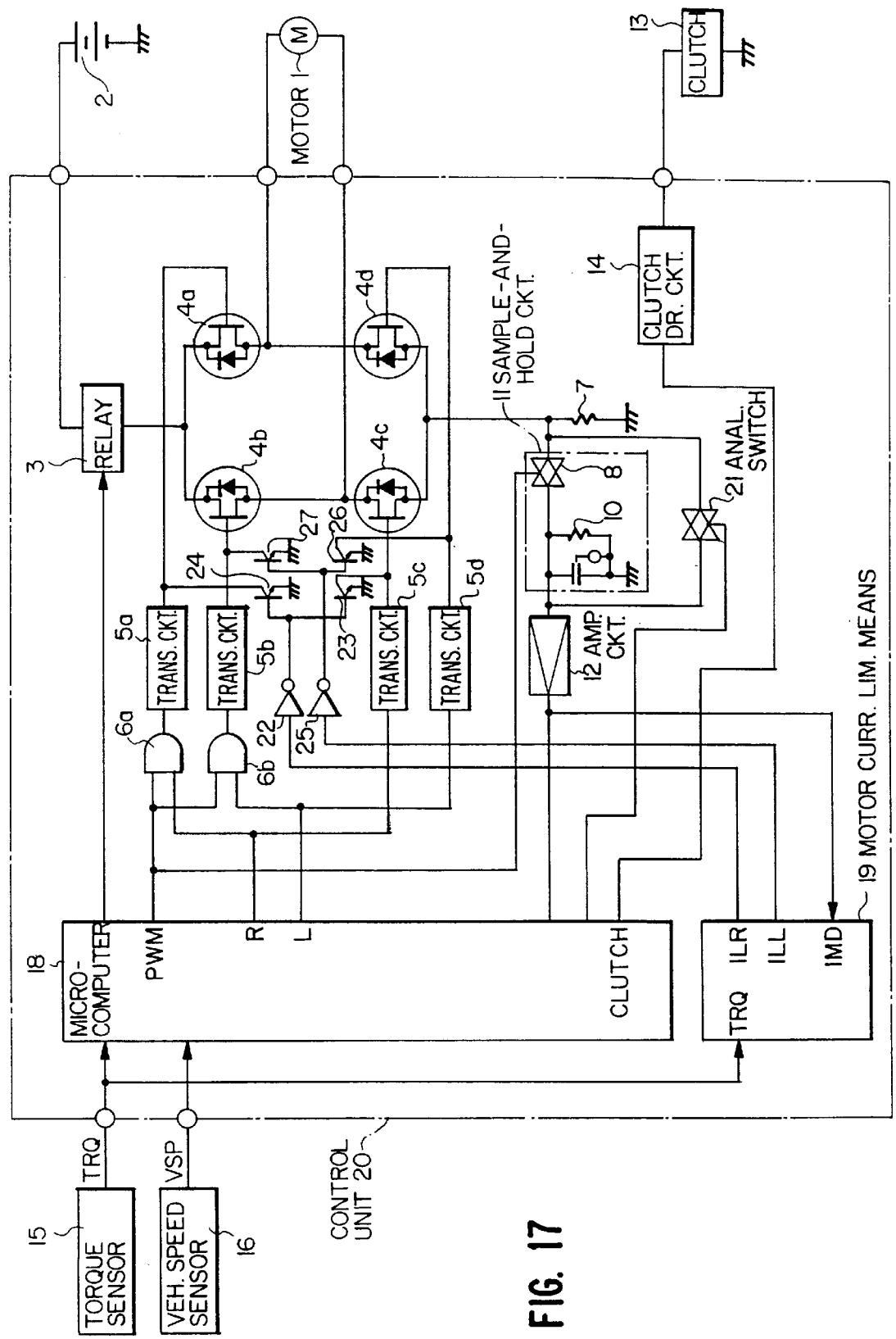
FIG. 17 is a schematic circuit diagram of embodiment 4 of the invention.

As described above, by employing the circuit of above arrangement shown in FIG. 17, the motor current is set to be less than the predetermined value TH3 even when the motor current flows in the reverse direction of steering torque due to trouble in the transistor drive circuits 5a to 5d and the AND circuits 6a, 6b. Furthermore, since the motor current is detected by turning on the analog switch 21 even when the motor current is zero and the PWM signal is low, the motor current limiting means 19 can be effectively operated even when the motor is off.

Though the inertia compensation control, torque loss compensation, etc. are not mentioned in this embodiment, it is preferable to incorporate them into this embodiment.

Embodiment 5

Embodiment 5 of the invention is an example of forcedly setting the motor current indicated value IMI to zero when the motor 1 shown in FIG. 1 is inhibited from being driven, and is hereinafter described with reference to FIGS. 18 to 20. In addition, the entire arrangement of the circuit is the same as that of embodiment 1 shown in FIG. 1, FIG. 2 and FIG. 6 and therefore its description is omitted. Operation is hereinafter described with reference to the flow chart shown in FIG. 18.

At the start of this flow chart, a steering torque TRQ detected by the torque sensor 15 is delivered to the microcomputer 18 in step S1, and then a vehicle speed VSP detected by the vehicle speed sensor 16 is delivered to the microcomputer 18 in step S2. In the same manner, the motor speed NM detected by the motor rotation speed sensor 17 is applied to the microcomputer 18 in step S40. Then the microcomputer 18 performs a required processing based on the data delivered thereto in step S41, and derives an indicated value IMI of the motor current using the target current deciding means 100 and the inertia compensation means 101.

Then it is judged in step S42 whether or not the indicated value of the motor current derived in this manner is less than a threshold value TH3 (3A, for example) in the motor current limiting means 19. If it is judged in step S42 that the indicated value IMI of the motor current is greater than the predetermined value TH3 (NO), then it is judged in next step S43 whether or not the steering torque signal TRQ is greater than the predetermined value TH1 set in the motor current limiting means 19 (for example, when the steering torque indicates a right torque over 1N·m). If it is judged in step S43 that the steering torque signal TRQ is greater than the predetermined value TH1 (NO), then it is judged in step S44 whether or not the steering torque signal TRQ is less than the predetermined value TH2 (for example, when the steering torque indicates a left torque over 1N·m). If it is judged YES in any of steps S42, S43, or S44, the indicated motor current value is set to the value derived in step S41.

Further, if it is judged that the indicated motor current value is greater than the threshold value TH3 (NO) in step S42 and that the steering torque signal TRQ is between the threshold values TH1 and TH2, then the indicated value IMI of the motor current is set to zero in step S45. Then, the motor current is controlled in step S46 by a PWM signal so that the indicated motor current value IMI set through any of steps S42 to S45 is equal to the detected motor current value IMD.

In the same manner as in steps S7 to S9 of embodiment 3, the processing of motor current abnormality detection is performed in step S7, and if there is no abnormality in the motor current, the flow branches in step S8 to step S1 to repeat the processing. If an abnormality in the motor current is detected, the flow branches in step S8 to step S9 where the microcomputer 18 turns off the motor 1, clutch 13 and relay 3, whereby the electric power steering control is stopped.

In this embodiment, since it is judged in steps S42, S43, S44 whether or not the motor drive is inhibited and the indicated value IMI of the motor current is limited to zero when the motor drive is inhibited in step S45, it is not necessary to have a processing step in which current error is detected by checking for a predetermined value (5A, for example).

Figure 20:
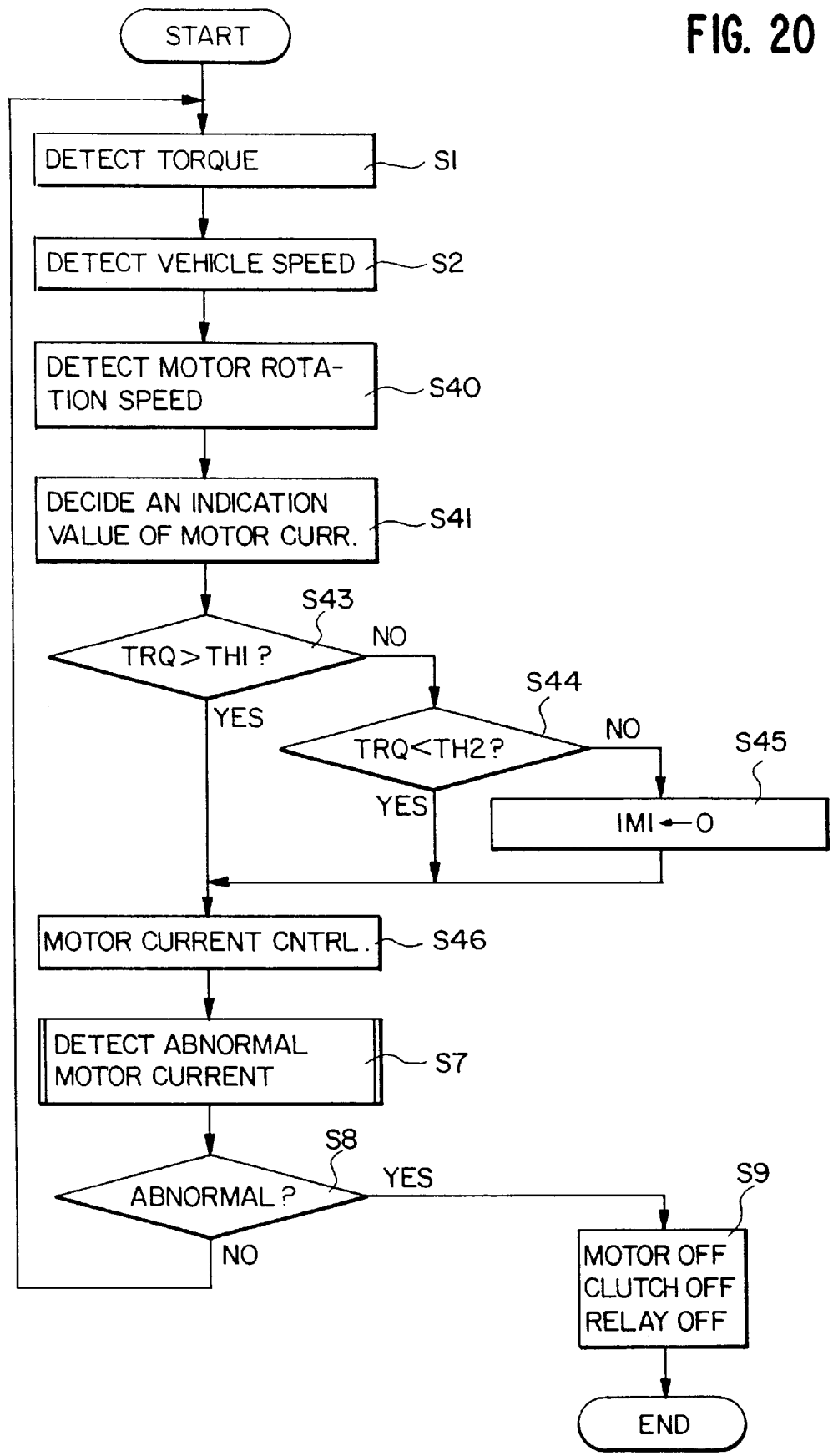
FIG. 20 is a flow chart showing the control when employing the motor current limiting means in FIG. 19.

Further in this embodiment, though the motor current limiting means 19 is based on both the steering torque TRQ and the detected motor current value IMD, it is preferable to also employ the motor current control means based on the steering torque TRQ as shown in FIG. 19 to achieve the same advantage by performing control as shown in the flow chart in FIG. 20.

Figure 18:
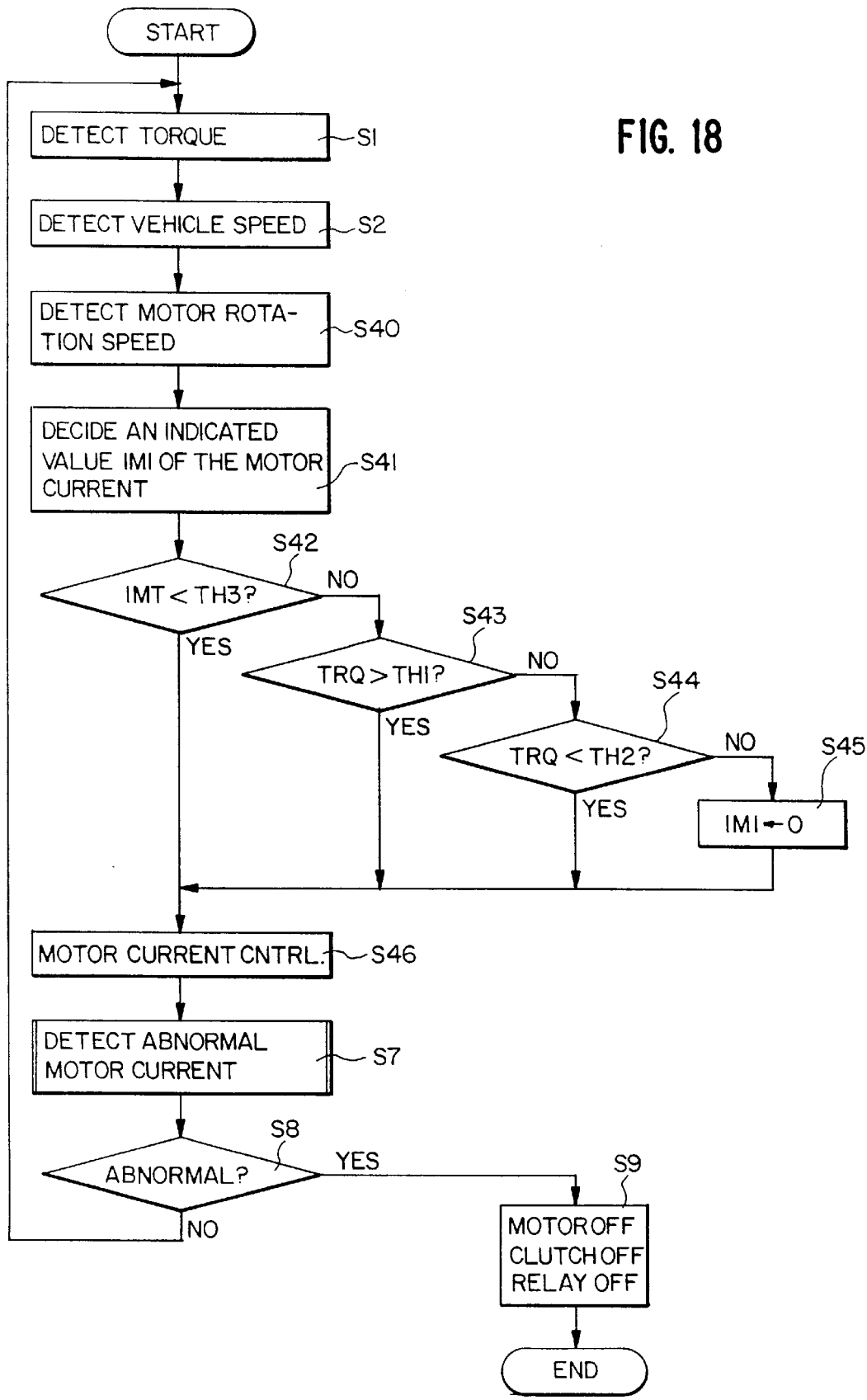
FIG. 18 is a flow chart showing the control according to the embodiment 5 of the invention.

More specifically, the step S42 in the flow chart in FIG. 18 is omitted, and after performing the motor current target value deciding processing in step S41, if the steering torque signal TRQ is between the threshold values TH1 and TH2 (i.e., when step S44 is NO) as shown in steps S43, S44, the indicated value IMI of the motor current is set to zero in step S45. Thereafter, in the same manner as the flow chart in FIG. 18, steps for controlling the motor current are performed from step S46.

Embodiment 6

Embodiment 6 of the invention monitors the leftward and rightward drive inhibit signals ILL, ILR by the microcomputer 18, and is hereinafter described with reference to FIG. 21. This drawing shows a circuit like the one shown in FIG. 1, and this circuit is arranged so that the rightward drive inhibit signal ILR and the leftward drive inhibit signal ILL of the electric motor 1 can be monitored by the microcomputer 18. Buffers 28, 29 are added for adjusting the input signal level of the microcomputer 18 to the level of the rightward drive inhibit signal ILR and the leftward drive inhibit signal ILL, and the rightward drive inhibit signal ILR is input to an input port P1 and the leftward drive inhibit signal ILL is input to an input port P2. The remaining parts are the same as the foregoing embodiment 1 and a description thereof is therefore omitted.

Figure 21:
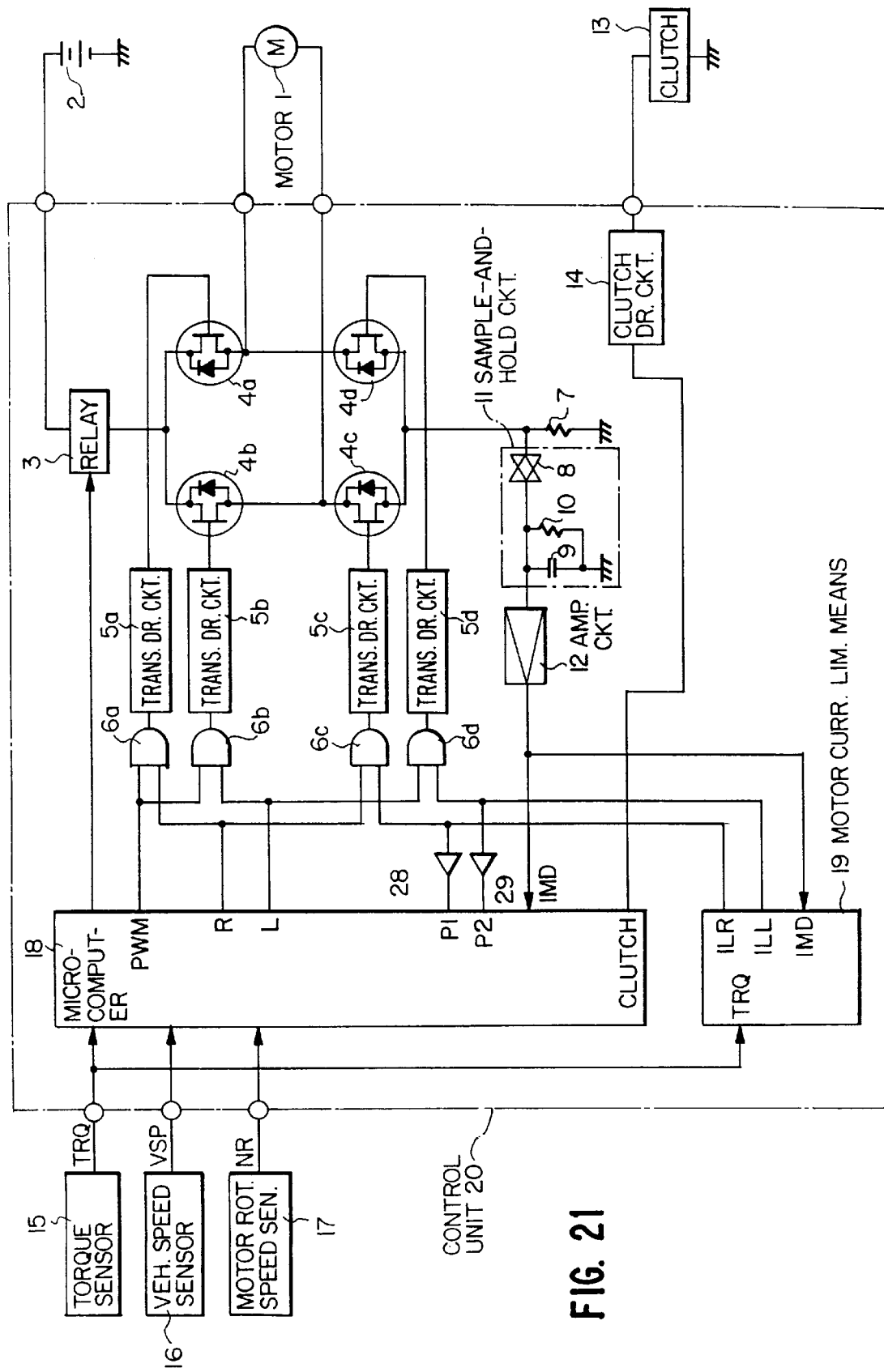
FIG. 21 is a schematic circuit diagram of embodiment 6 of the invention.
Figure 22:
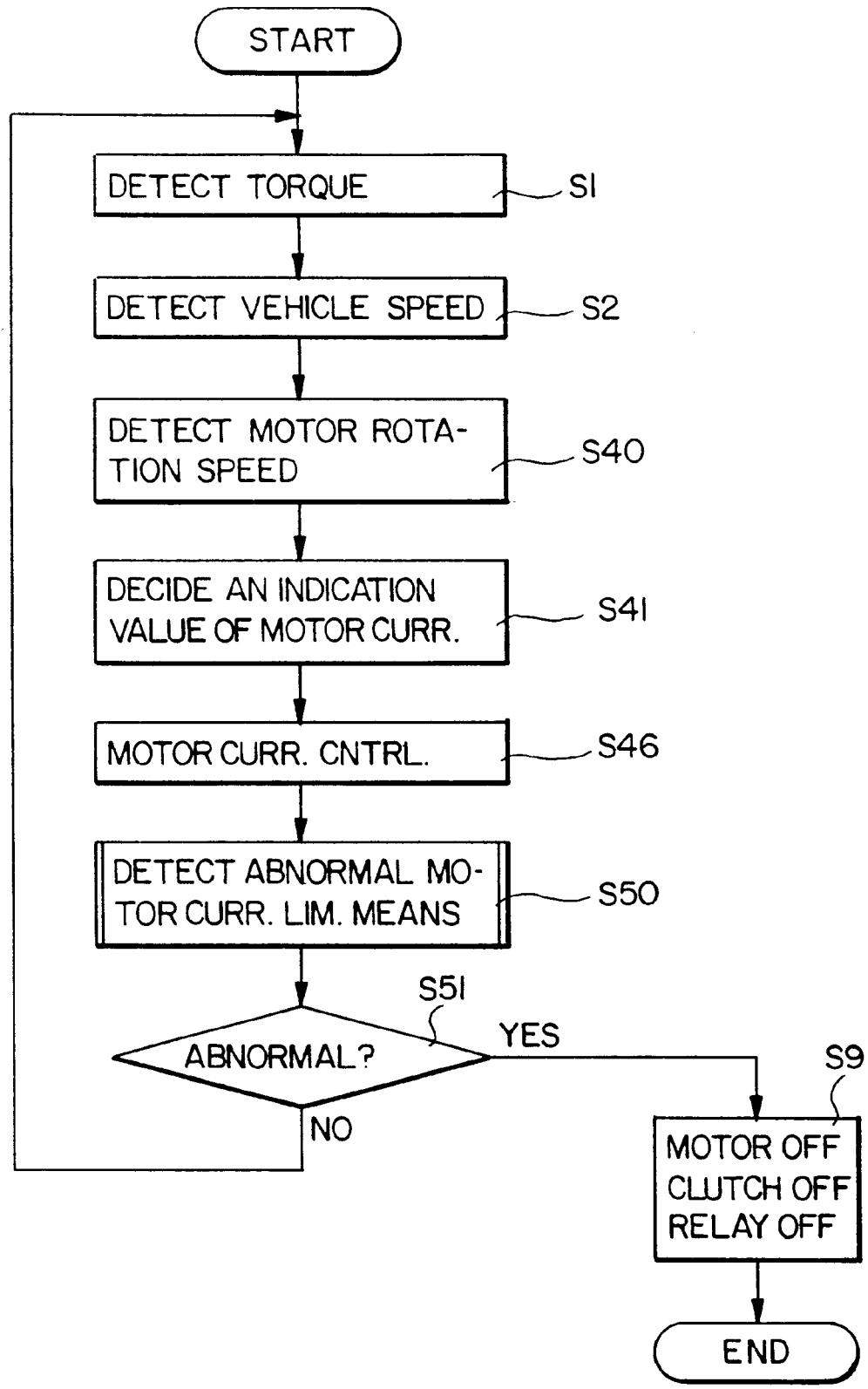
FIG. 22 is a flow chart showing the control according to embodiments 6 and 7 of the invention.

Operation of this embodiment shown in FIG. 21 is hereinafter described with reference to the flow chart in FIG. 22. At the start of this flow chart, a steering torque signal TRQ detected by the torque sensor 15 is input to the microcomputer 18 in step S1, and then a vehicle speed signal VSP detected by the vehicle speed sensor 16 is input to the microcomputer 18 in step S2. Likewise in step S40, a motor rotation speed signal NM detected by the motor rotation speed sensor 17 is input to the microcomputer 18. Then in step S41, the microcomputer 18 performs a processing based on the data delivered thereto, derives an indicated value IMI of the motor current in accordance with the target current detecting means 100 and inertia compensation means 101, and in step S46 performs PWM control of the motor current so that the indicated value IMI of the motor current is equal to the detected value IMD of the motor current. Further, in step S50, processing for detecting abnormality of the motor current limiting means 19 is performed, and if no abnormality is detected in step S50, the flow branches in step S51 to step S1 to repeat the processing steps. If an abnormality is detected in step S50, the flow branches in step 51 to step 9 where the microcomputer 18 performs processing for turning off the motor 1, clutch 13 and relay 3 to stop the electric power steering control.

Figure 23:
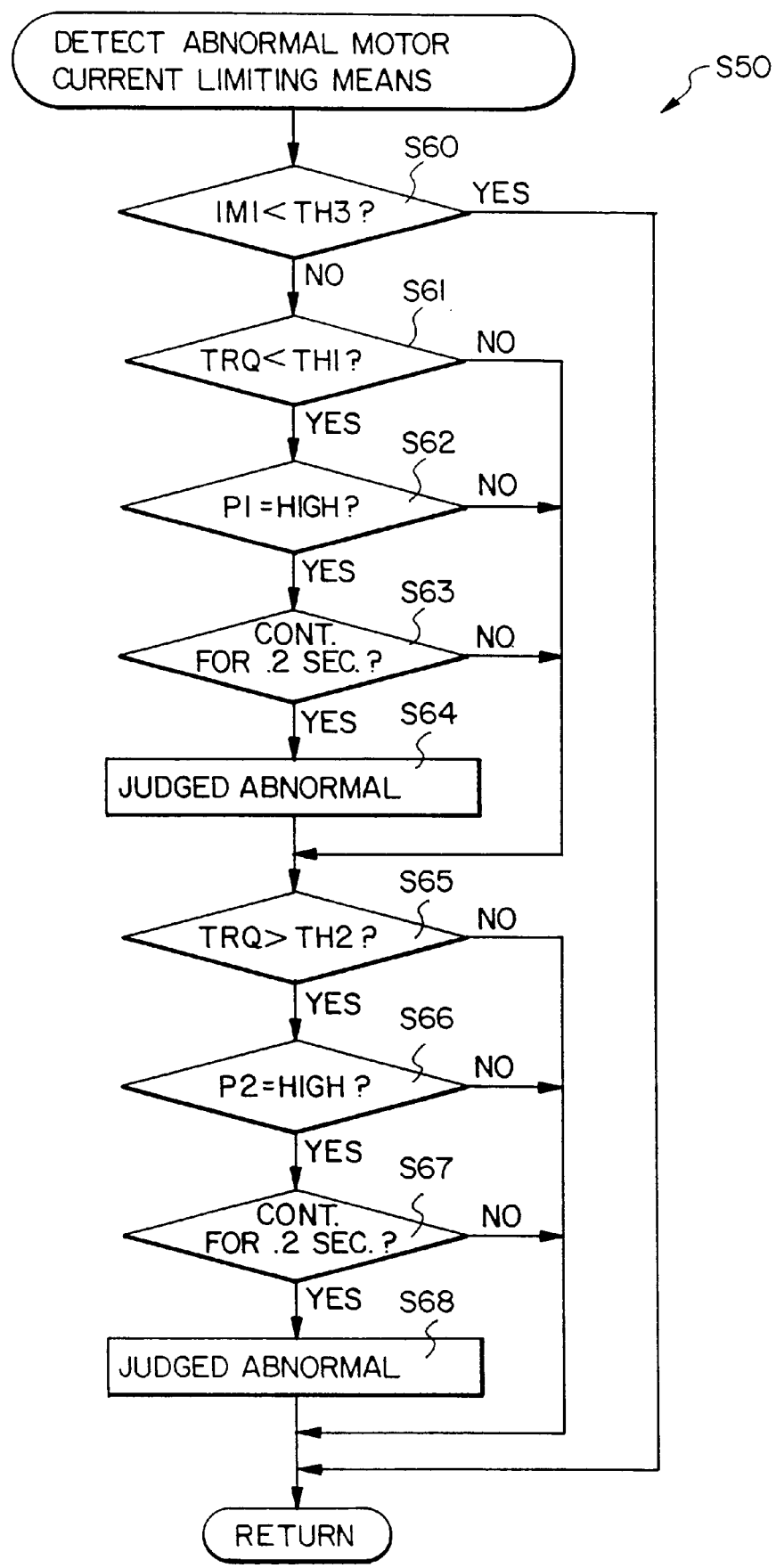
FIG. 23 is a flow chart showing the abnormal motor current detection processing according to embodiment 6 of the invention.

The abnormality detection processing of the motor current limiting means 19 is hereinafter described in detail with reference to the flow chart shown in FIG. 23. First, it is judged in step S60 whether or not the indicated value of the motor current is under the predetermined value TH3, and if it is judged YES, the abnormality detection processing of the motor current limiting means 19 is not necessary and is terminated. If the indicated value IMI of the motor current is greater than the predetermined value TH3, the flow branches in step S60 to step S61. Then it is judged in step S61 whether or not the steering torque signal TRQ is less than the predetermined value TH1 as to the rightward drive of the motor, and if it is judged YES, then it is further judged in next steps S62, S63 whether or not the port P1 remains continuously high for a predetermined time (0.2 sec, for example). If it is judged that the port P1 does remain high for this period, it is judged in step S64 that the motor current control means 19, i.e., the rightward drive inhibit means, are abnormal. This serves as a first trouble judgement means. Further, with regard to the leftward drive of the electric motor, it is judged in step S65 whether or not the steering torque signal TRQ is greater than the predetermined value TH2, and if it is judged YES, it is further judged in steps S66, S67 whether or not the port P2 remains continuously high for a predetermined time (0.2 sec, for example). And if it is judged that the port P2 remains high for this period, it is further judged in step S68 that the motor current limiting means 19, i.e., the leftward drive inhibit means, are abnormal. This serves as a second trouble judgment means.

When either the first or second trouble judgment means judges the occurrence of trouble, it is possible to detect an abnormality of the motor current limiting means 19. The electric power steering control is stopped when the motor current limiting means 19 are abnormal, whereby safety can be improved.

Embodiment 7

Figure 25:
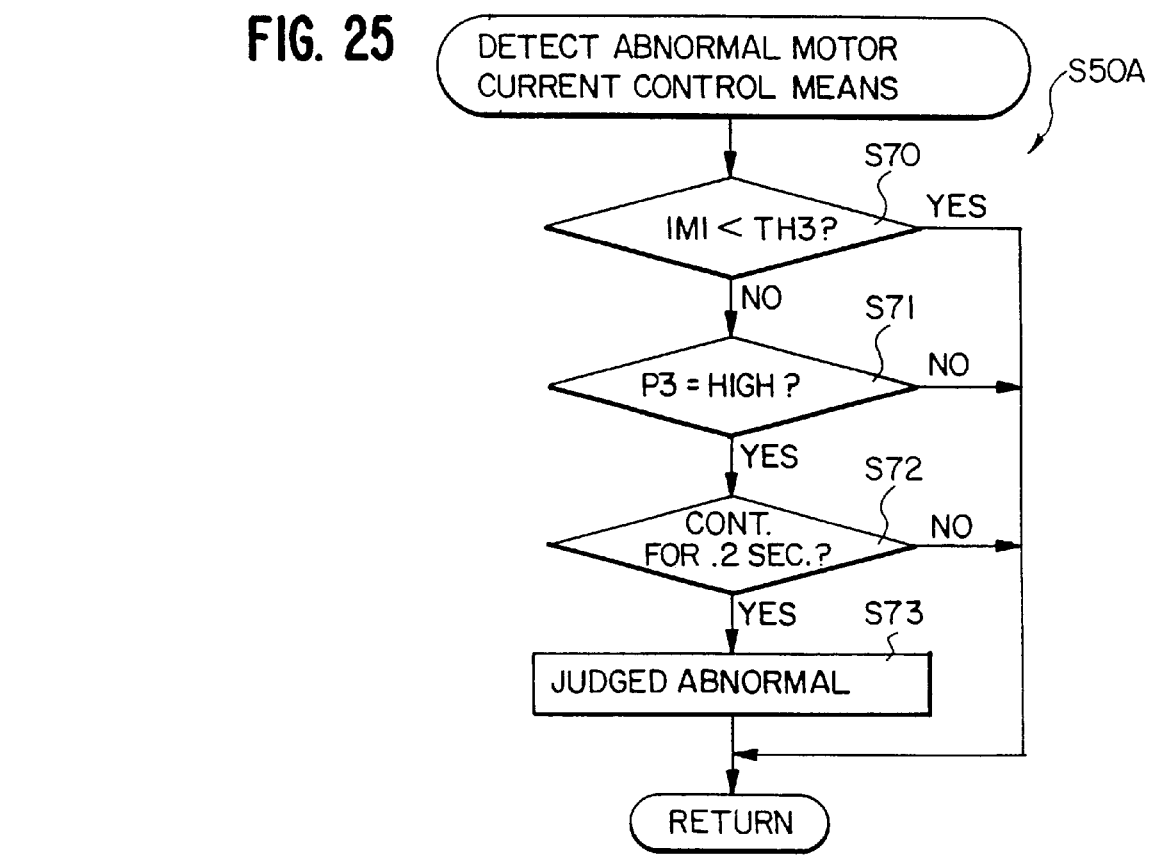
FIG. 25 is a flow chart showing the abnormal motor current detection processing according to the embodiment 7 of the invention.
Figure 24:
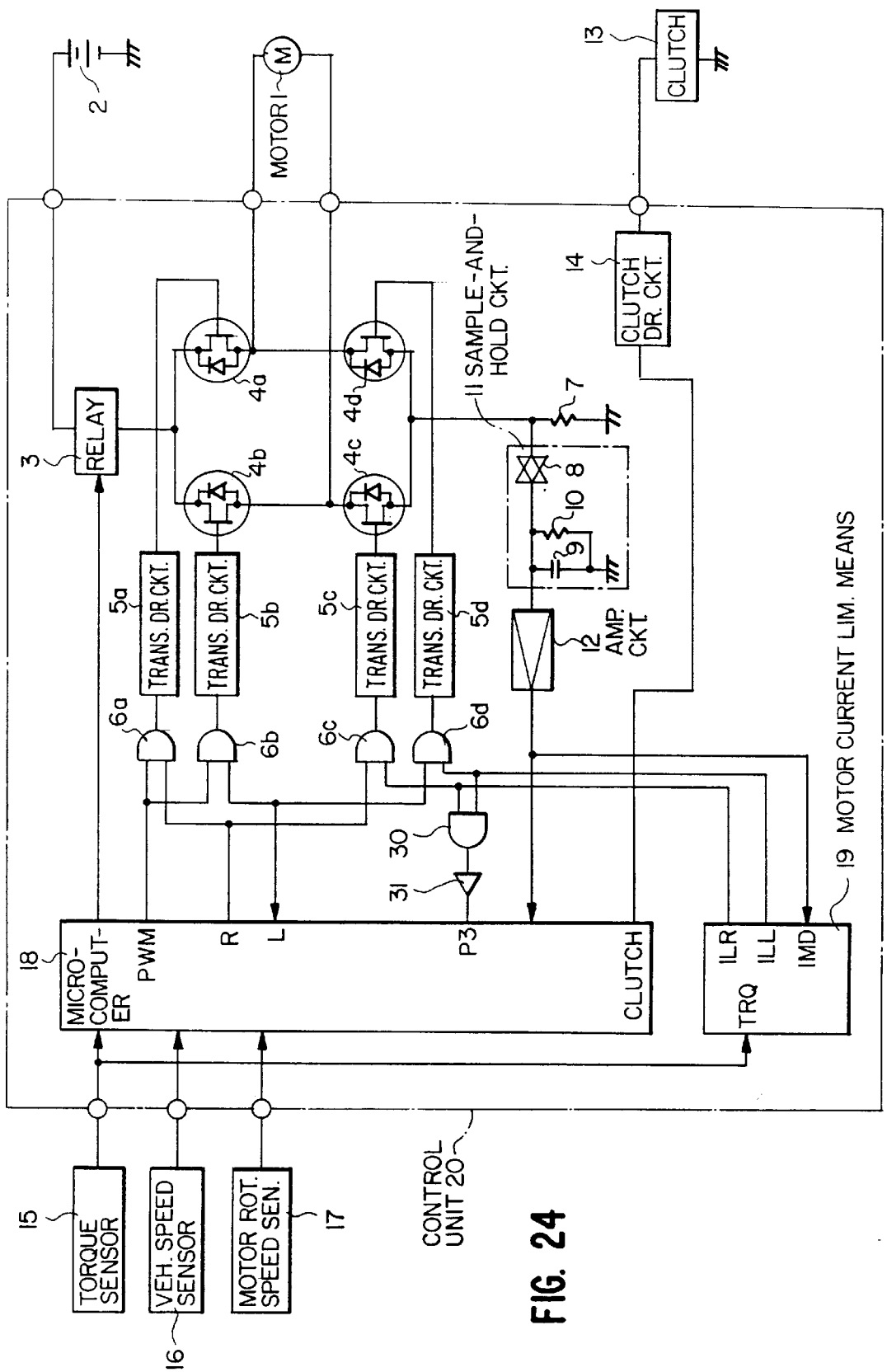
FIG. 24 is a schematic circuit diagram of embodiment 7 of the invention.

Embodiment 7 of the invention stops the electric power steering control by detecting an abnormality of the leftward and rightward drive inhibit signals ILL, ILR and is hereinafter described with reference to FIGS. 24 and 25. This drawing is a circuit diagram similar to that of FIG. 1, but has an AND circuit 30 serving as judgment means and a buffer 31 for conforming the input signal level of the microcomputer 18 to the output level of the AND circuit 30, so that the AND circuit logically multiples the rightward drive inhibit signal ILR and leftward drive inhibit signal ILL and inputs the resulting signal to an input port P3. The remaining parts are the same as the foregoing embodiment 1 and a description thereof is therefore omitted. The basic processing is the same as that of embodiment 6 shown in the flow chart in FIG. 22, and is therefore not described.

Abnormality detection processing (which corresponds to step S50 in FIG. 22) of the motor current limiting means 19 is hereinafter described with reference to the flow chart of FIG. 25. In the abnormality detection process S50A of the motor current limiting means, first it is judged in step S70 whether or not the indicated value IMI of the motor current is less than the predetermined value TH3, and if it is the abnormality detection processing of the motor current limiting means 19 is not necessary and is terminated. If the indicated value IMI of the motor current is greater than the predetermined value TH3, the flow branches to step S71 where it is judged whether or not the port P3 is high. If port P3 is judged high, it is further judged in step S72 whether or not the high state remains continuous for a predetermined time (0.2 sec, for example). And, if the judgement is affirmative, then it is determined in step S73 that the motor current control means 19 is abnormal.

In step S70, when the indicated value IMI of the motor current is greater than the predetermined value TH3 (3A, for example), if the steering torque signal TRQ indicates right, the rightward drive inhibit signal ILR is high and the leftward drive inhibit signal ILL is low. On the other hand, if the steering torque signal TRQ indicates left, ILR is low and ILL is high. In this manner, when the indicated value IMI of the motor current is greater than the predetermined value TH3, either ILR or ILL is low, and the output of the AND circuit 30 is low, so that the signal applied to the input port P3 of the microcomputer 18 is low. However, when the motor current limiting means 19 is malfunctioning so that the motor drive inhibit signal in the reverse direction of the steering torque is high, both ILR and ILL are high and the signal applied to the input port P3 from AND circuit 30 is also high. This indicates an abnormality of the motor current limiting means 19 in either the rightward drive inhibit means or the leftward drive inhibit means. When the motor current limiting means 19 are judged abnormal, the electric power steering control is stopped, thereby enhancing safety. In addition, in this embodiment, there is a further advantage in that only one input port is sufficient for monitoring the rightward drive inhibit signal ILR and leftward drive inhibit signal ILL.

Embodiment 8

In embodiment 8 of the invention the motor and the electric power steering control are stopped, irrespective of the steering torque, due to an abnormality of the microcomputer. This embodiment is hereinafter described with reference to FIG. 26. In the drawing, reference numeral 32 denotes motor drive limiting means for monitoring the operation of the microcomputer 18 and stopping the motor drive due to an abnormality, and numerals 6c, 6d, 33, and 34 denote AND circuits. According to this arrangement, the electric motor is stopped by the AND circuits 6c, 6d when MTOFF signal from the motor drive limiting means 32 is low, and the relay 3 is turned of f by the AND circuit 33 and the clutch 13 is turned off by the AND circuit 34 when PSOFF signal is low.

Figure 26:
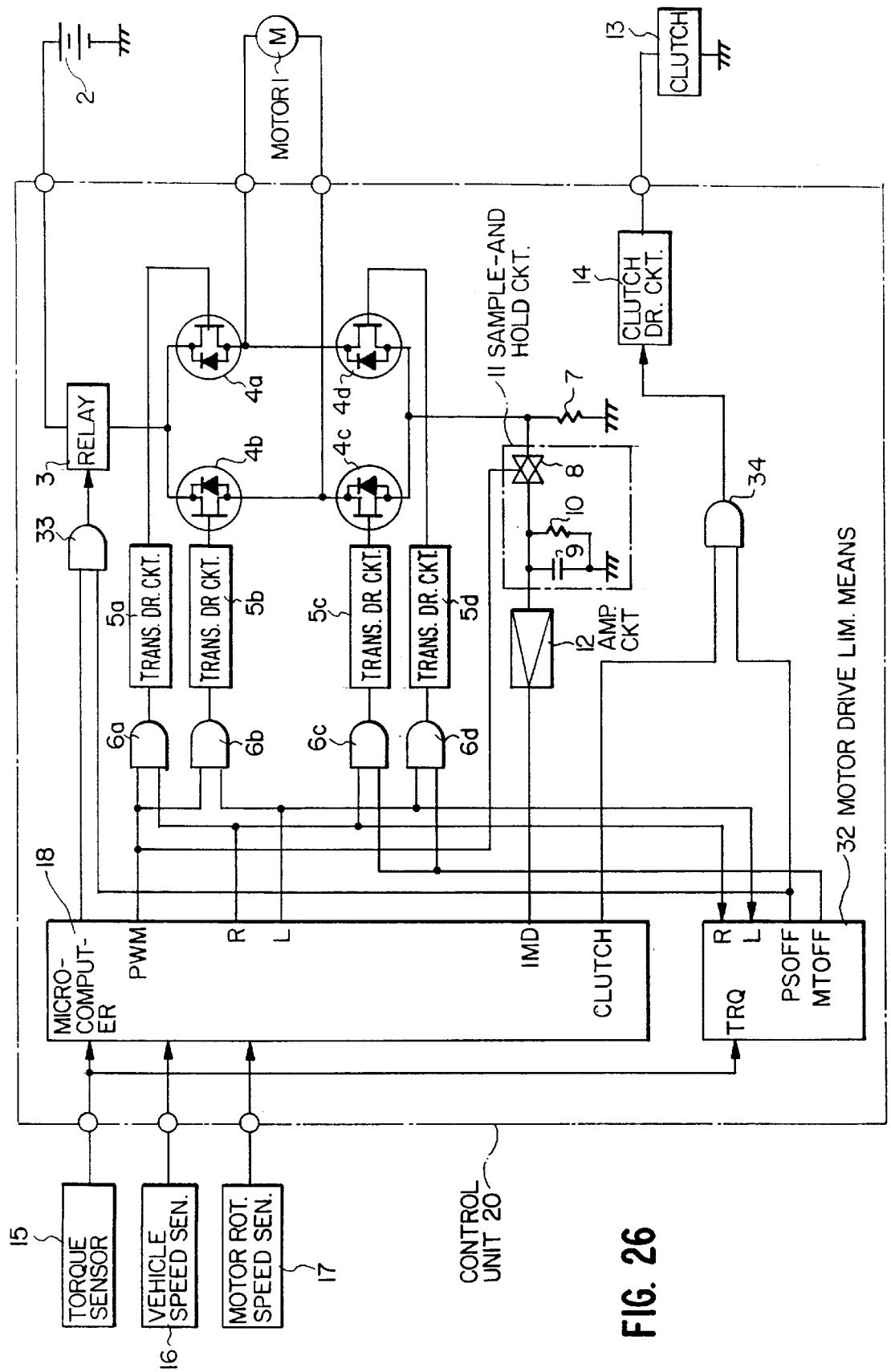
FIG. 26 is a schematic circuit diagram of embodiment 8 of the invention.
Figure 27:
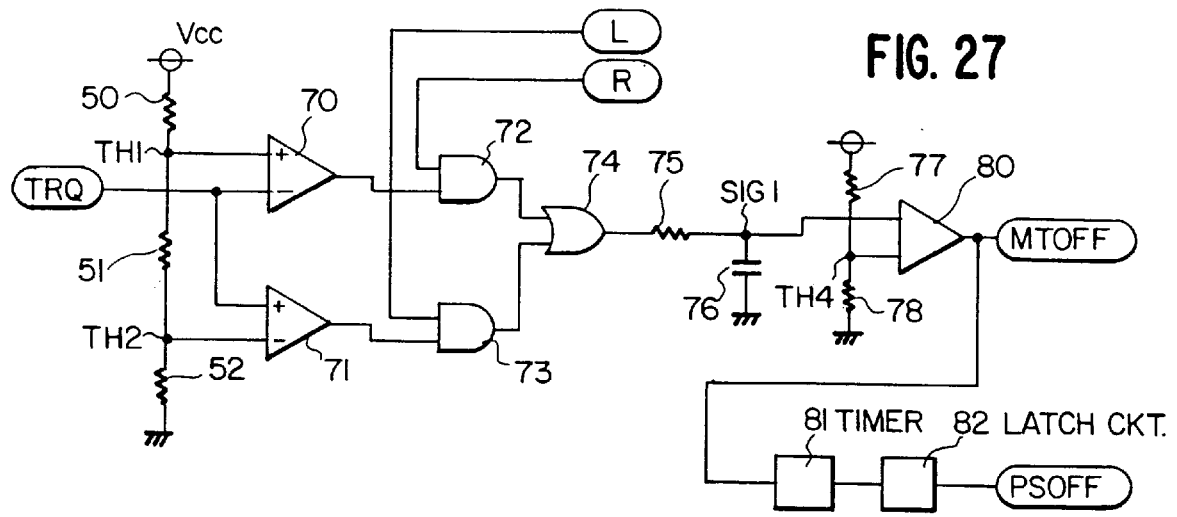
FIG. 27 is a circuit diagram showing the motor current limiting means according to embodiment 8 of the invention.
Figure 28A:
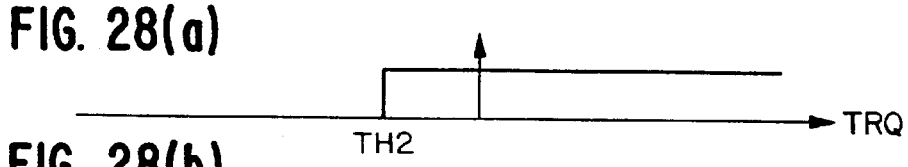
FIGS. 28(a) and 28(b) are graphs showing the operation of the circuit in FIG. 27.
Figure 28B:
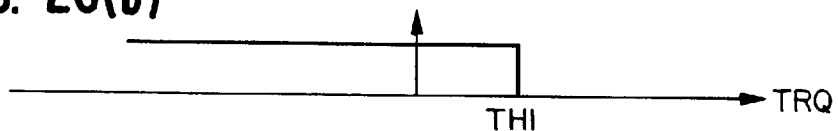

The circuit of the motor drive limiting means 32 shown in FIG. 26 is hereinafter described in detail with reference to FIG. 27. In the drawing, reference numerals 50, 51, and 52 denote resistors by which the predetermined values TH1, TH2 are decided. Numeral 70 denotes a comparator for comparing the steering torque signal TRQ with the predetermined value TH1, and the output signal of the comparator 70 is as shown in FIG. 28(*b*). Numeral 71 denotes a comparator for comparing the steering torque signal TRQ with the predetermined value TH2, and the output signal of the comparator 71 is as shown in FIG. 28(*a*). The output signal TRQ of the torque sensor 15 is the same as that of embodiment 1 shown in FIG. 3, and accordingly, the predetermined value TH1 is a threshold value (1N·m of rightward steering, for example) of rightward torque, and the predetermined value TH2 is a threshold value (1N·m of leftward steering, for example) of leftward torque.

The characteristic of the motor current is shown in FIG. 7, and the motor is driven rightward when the steering torque TRQ is greater than the predetermined value TH1, and the motor is driven leftward when the steering torque TRQ is less than the predetermined value TH2. The output signal of the comparator 70 is therefore low when the motor is driven leftward and high at any other time. Reference numerals 72 and 73 denote AND circuits, and numeral 74 denotes an OR circuit arranged as shown in FIG. 27. Therefore, the output signal of the OR circuit 74 is high either if the microcomputer 18 drives the electric motor rightward when the torque signal TRQ is less than the predetermined value TH1, or if the microcomputer 18 drives the motor leftward when the torque signal TRQ is greater than the predetermined value TH2. In other words, the output signal is high when the direction of torque is different from that of the motor.

Numeral 75 denotes a resistor and 76 denotes a capacitor, by which the output signal of the OR circuit 74 is smoothed. Numerals 77 and 78 denote resistors for determining a predetermined value TH4, and comparator 80 compares the output signal of the OR circuit 74 with a smoothed signal SIG1. When SIG1 is greater than the predetermined value TH4, the MTOFF signal is low. The MTOFF signal is further input to a timer 81, and when the low state continues for a predetermined time (0.2 sec, for example), the PSOFF signal is low until the power source is turned off by a latch circuit 82. The remaining parts are arranged the same as in the foregoing embodiment 1, and therefore further description is omitted herein.

Operation of this embodiment is hereinafter described assuming the same condition as in embodiment 1. In FIG. 29, (a) denotes a steering angle θ; (b) denotes an indicated value IMI of the motor current; (c) denotes a PWM signal; (d) is a rightward drive signal R; (e) is a leftward drive signal L; (f) is an output signal of the OR circuit 74; (g) is a smoothed signal obtained by smoothing (f); (h) is a MTOFF signal; (i) is a PSOFF signal; and (j) is a steering torque signal.

The steering operation is started at time ① in the same manner as embodiment 1, and when the steering wheel stops at time ②, a motor current flows as shown in (b) to compensate for the inertia of the motor. At time ②, a current flows for a moment in the reverse direction of the steering torque. Accordingly, the output of the OR circuit 74 is high for that moment. However, the smoothed signal SIG1 has not reached the predetermined value TH4 and, therefore, the MTOFF signal and PSOFF signal remain high. Thus, as the motor control is not limited, deterioration of steering "feel" caused by inertia is reduced.

Described hereinafter is a malfunction in which the motor is continuously driven in one direction irrespective of the steering torque due to imperfect contact of the torque signal input terminal of the microcomputer 18, a malfunction of the port for motor drive, or the like. For example, a rightward drive condition without any steering is shown in FIG. 30. In this drawing, (a) denotes a PWM signal; (b) is a rightward drive signal R; (c) is a leftward drive signal L; (d) is an output signal of the comparator 70; (e) is an output signal of the comparator 71; (f) is an output signal of the OR circuit 74; (g) is a smoothed signal SIG1 obtained by smoothing (f); (h) is a MTOFF signal; (i) is a PSOFF signal; and (j) is a motor current.

When an abnormality take places at the time ①, the PWM output port is in the PWM operation or fixed to be high and the rightward drive signal R is high, then output of the OR circuit is high, the capacitor 76 is charged, and the signal SIG1 is thereby increased. When the signal SIG1 is greater than the predetermined value TH4, the MTOFF signal is low. Since the MTOFF signal is connected to the AND circuits 6c, 6d, the transistor 4c is turned off to stop the motor. Further, when such a state continues for a predetermined time T (0.2 sec, for this embodiment), the latch circuit 82 is latched and the PSOFF signal is low, control of the power steering is stopped until the relay and clutch are turned off to disconnect the power source.

Described hereinafter is a case in which the motor is driven intermittently irrespective of the steering torque due to imperfect contact of the microcomputer 18 or due to a malfunction of the microcomputer 18. For example, FIG. 31 shows a case in which the motor is driven intermittently rightward when there is no steering torque. In this drawing, (a) denotes a PWM signal, (b) denotes a rightward drive signal, (c) denotes a leftward drive signal, (d) denotes the output signal of the comparator 70, (e) denotes the output signal of the comparator 71, (f) denotes the output signal of the OR circuit 74, (g) denotes the signal SIG1 obtained by smoothing signal (f), (h) denotes the MTOFF signal, (i) denotes the PSOFF signal, and (j) denotes a motor current.

A rightward drive is repeated during the periods indicated by "I" and the motor is off during the periods indicated by "II" as a result of a malfunction, and therefore the output of the OR circuit 74 cycles high and low. When the smoothed signal SIG1 is gradually raised and exceeds the predetermined value TH4, the MTOFF signal is low and the transistor 4c is forcedly turned off, thereby stopping the motor 1. If such a trouble state continues for a predetermined time (0.2 sec, for example), the latch circuit 82 is latched low, the PSOFF signal is low, and the relay 3 and the clutch 13 are turned off, whereby the control of the power steering is stopped until the power source is turned off.

As described above, in embodiment eight, if the motor is driven in the reverse direction of the steering torque during the normal state, the reverse drive is not inhibited and, therefore, it becomes possible to improve the steering feel by inertia compensation or the like. On the other hand, if the electric motor is driven irrespective of the steering torque due to a malfunction of the microcomputer, the motor is stopped and, furthermore, control of the power steering is stopped. As a result, safety is improved. Further, even if the reverse direction drive is generated intermittently, since an abnormal output is judged by comparing the level of the smoothed signal SIGI which is the OR circuit output signal showing a generation of the reverse direction drive with the predetermined value TH4, when the duration of the reverse direction drive generation time becomes large when compared to the time during which the reverse direction drive is not generated (time T2), the level of the smoothed signal SIGI exceeds the predetermined value TH4, whereby abnormality can be detected. On the contrary, when the duration of the reverse direction non-generation time T1 becomes small when compared to the reverse direction non-generation time T2, the level of the smoothed signal SIGI does not exceed the predetermined value TH4 whereby abnormality cannot be detected. In this case, the motor current flows intermittently in the reverse direction against the steering torque, but an excessively large torque is not produced because the predetermined value TH4 is set such that the average value of the intermittent motor current in such a case will be small (3A, for example, in this embodiment), whereby safety is not affected. This arrangement is effective even when the motor current detecting means is out of order and the detected motor current value is zero at all times.

Embodiment 9

Figure 32:
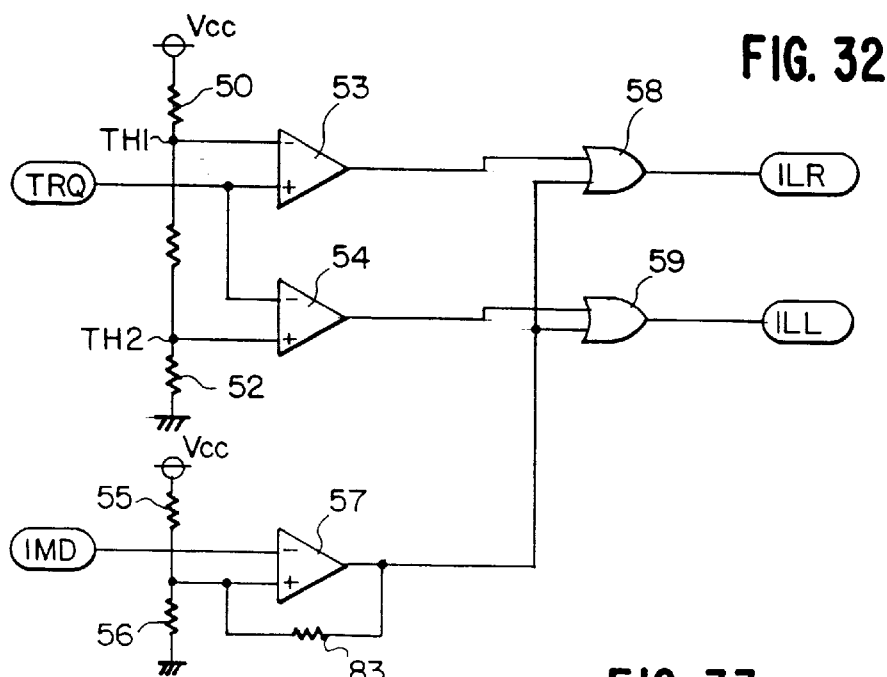
FIG. 32 is a circuit diagram of the motor current limiting means according to embodiment 9 of the invention.
Figure 33:
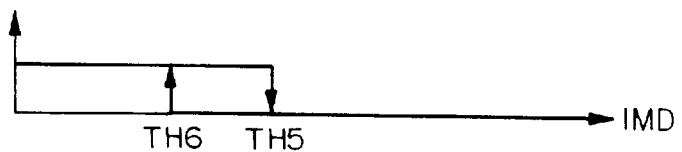
FIG. 33 is a graph showing the operation of the motor current limiting means of FIG. 32.

Embodiment 9 of the invention provides a threshold value of the detected motor current value IMD with hysteresis, and is hereinafter described with reference to FIGS. 32–34. This embodiment is a modification of the motor current limiting means 19 of embodiment 1 as shown in FIG. 32. The circuit in FIG. 32 is arranged by adding a resistor 83 to the embodiment of FIG. 2 and the threshold value of the motor current is provided with a hysteresis. The input/output characteristic is as shown in FIG. 33. Accordingly, in the motor current limiting means 19, when the detected motor current value IMD is less than a predetermined value TH5 (3A, for example), both rightward drive inhibit signal ILR and leftward drive inhibit signal ILL are high, and when the detected motor current value IMD is greater than the predetermined value TH5, the rightward drive inhibit signal ILR and leftward drive inhibit signal ILL have characteristics as shown in FIG. 4. When the detected motor current value IMD is less than a predetermined value TH6 (2A, for example), both rightward and leftward drive inhibit signals ILR, ILL are again high.

Operation of this embodiment is hereinafter described with reference to FIG. 34. In this drawing, (a) denotes operation of the transistor 4a; (b) denotes operation of the transistor 4b; (c) denotes operation of the transistor 4c; (d) denotes operation of the transistor 4d; and (e) denotes an indicated motor current value IMD. FIG. 34 shows a state in which a trouble occurs in the microcomputer 18 at the time ① when the steering torque is neutral and the motor is in the rightward drive condition. When falling in the rightward motor drive condition, the motor current is increased at an inclination according to the time constant of the electric motor. Since the steering torque is neutral, the rightward and leftward drive inhibit signals ILR, ILL are both low, and the transistor 4c is turned off at the time ②, whereby the detected motor current value IMD is reduced forming an inclination according to the time constant of the motor. When the detected motor current value IMD is less than the predetermined value TH6, the output of the comparator 57 is again high, and both rightward and leftward drive inhibit signals ILR, ILL are high, whereby the transistor 4c is turned on and the motor current is increased again from the time ③ to repeat the same operation thereafter.

As described above, by providing the threshold value of the detected motor current value with a hysteresis, the frequency with which the transistor cycles on and off can be lowered. If the on/off cycling frequency of a transistor is high, the transistor cannot follow and operates within its active region, possibly resulting in damage to the transistor. In embodiment 9, however, this problem can be avoided by restricting the on/off frequency of the transistor. This frequency can be restricted to be less than 30 kHz, for example. In addition, the same advantages as exhibited by embodiment 1 are also achieved.

As has been described above, the invention has the following effects.

(1) Since it is possible to drive in the reverse direction of the steering torque while limiting the motor current, steering feel can be improved, and motor control can be performed without affecting safety.

(2) Since it is possible to drive in the reverse direction of the steering torque, improvement in steering feel is easily performed by means of inertia compensation control, torque loss compensation control, etc. Since the current applied in the reverse direction of the steering torque is a small current which serves only to compensate the inertia or torque loss of the motor, a dangerous torque is not produced when such a current is applied in the reverse direction of the driving torque. As a result, steering feel can be improved without affecting safety. The same advantage can also be achieved with regard to phase compensation.

(3) An electric power steering control system is disclosed in which motor current is detected by a motor current detecting circuit using a sample-and-hold circuit and an abnormality in the motor current is detected in accordance with a detected motor current value, and since the detection of motor current is possible when the motor is not driven by turning on the sample-and-hold circuit, detection of an abnormality in the motor current becomes possible, resulting in a safer electric power steering control system.

(4) An electric power steering control system is disclosed comprising motor current detecting means for detecting a motor current using a sample-and-hold circuit, abnormal motor current detecting means for detecting abnormality in the motor current in accordance with the detected motor current value, and motor current limiting means for limiting the motor current in accordance with the steering torque and detected motor current value. Since detection of motor current is possible when the motor is not driven by turning on the sample-and-hold circuit, detection of an abnormality in the motor current is possible. Furthermore, it is possible to limit the motor current in the reverse direction of the steering torque by the motor current limiting means, resulting in a safer electric power steering control system.

(5) Because the target value of the motor current is established to be within a range limited by the motor current limiting means a current error does not take place between the indicated value of motor current and the detected value of motor current. Therefore erroneous detection of an abnormality in the motor current is eliminated, resulting in a more reliable electric power steering control system.

(6) Any abnormality in the motor current limiting means is detected, and if an abnormal condition is detected therefrom, the control of electric power steering is stopped, resulting in a safer electric power steering control system.

(7) There is a further advantage that because only one signal is employed for detecting abnormality in the motor current limiting means, only one input port of the microcomputer is required.

(8) Since the motor is stopped when a percentage of time during which the motor is driven in a reverse direction of the steering torque is greater than a predetermined value, reverse drive is possible as long as the percentage of reverse drive time is small, as for example, in the case of inertia compensation, steering feel is improved. In case the motor is continuously or intermittently driven irrespective of steering torque due to a malfunction in the microcomputer, the percentage of reverse drive time is increased and driving of the motor is stopped, thereby advancing safety. In case the motor is driven irrespective of steering torque intermittently for a small percentage of time, the motor drive is not stopped. However, the current passing through the electric motor in such a case is so small that a dangerous situation does not develop. The control system is operated effectively even when the motor current detecting means is out of order and the detected motor current value is zero at all times. In other words, steering feel can be improved without affecting safety.

(9) At the time of limiting the motor current, the driving frequency of the transistor which drives the motor is controlled so as to be less than a predetermined value, whereby operation of the transistor within the active region is avoided, thus preventing damage to the transistor.

The invention has been described with respect to certain preferred embodiments. various modifications and additions within the spirit of the invention will occur to those of skill in the art.

What is claimed is:

1. An electric power steering control system comprising:
steering force detecting means for detecting a steering force;
an electric motor for producing an auxiliary steering force;
a power source for supplying electric power to said electric motor;
a bridge circuit for driving said electric motor;
a sample-and-hold circuit for sampling and holding one of a current between said power source and said bridge circuit and a current between said bridge circuit and a ground synchronously with a pulse width modulation signal;

motor current detecting means for detecting a motor current using said sample-and-hold circuit;

motor current control means for determining a motor current value and a driving direction of the electric motor required by said electric motor at least in accordance with the steering force detected by said steering force detecting means, thereby controlling the motor current in the form of a pulse width modulation control; and abnormal motor current detecting means for detecting an abnormality in the motor current in accordance with the motor current value detected by said motor current detecting means;

characterized in that said sample-and-hold circuit is operated so as to perform the detection of motor current even when said electric motor is not operated according to said motor control means.

2. An electric power steering control system according to claim 1, further comprising motor current limiting means for limiting the motor current to be less than a predetermined value by turning off the electric power to said electric motor when the detected motor current value is less than the predetermined value, and in which when the motor current is limited, a driving frequency of a transistor for driving said electric motor is controlled so as to be less than a certain value.

3. An electric power steering control system comprising:

steering force detecting means for detecting a steering force;

an electric motor for producing an auxiliary steering force;

a power source for supplying electric power to said electric motor;

a bridge circuit for driving said electric motor;

a sample-and-hold circuit for sampling and holding one of a current between said power source and said bridge circuit and a current between said bridge circuit and a ground synchronously with a pulse width modulation signal;

motor current detecting means for detecting a motor current using said sample-and-hold circuit;

motor current control means for determining a motor current value and a driving direction of the electric motor required by said motor at least in accordance with the steering force detected by said steering force detecting means, thereby controlling the motor current in the form of a pulse width modulation control;

abnormal motor current detecting means for detecting an abnormality in the motor current in accordance with the motor current detected by said motor current detecting means; and motor current limiting means for causing said sample-and-hold circuit to detect the motor current even when said electric motor is not operated according to said motor control means, limiting said motor current so that the electric motor is limited from being driven in a reverse direction of said steering force when the steering force detected by said steering force detecting means is greater than a first predetermined value and the motor current value detected by said motor current detecting means is greater than a second predetermined value, and supplying a current to said electric motor irrespective of direction of said steering force when the motor current value detected by said motor current detecting means is less than a predetermined value.

4. An electric power steering control system according to claim 3, wherein said motor current limiting means limits the motor current to be less than a predetermined value by turning off power source motor when the detected motor current is greater than a third a predetermined value, and in which when the motor current is limited, a driving frequency of a transistor for driving said electric motor is controlled so as to be less than a predetermined value.

5. An electric power steering control system comprising:

steering force detecting means for detecting a steering force;

an electric motor for producing an auxiliary steering force;

motor current detecting means for detecting a motor current of said electric motor;

motor current control means for determining a motor current target value and a driving direction of the electric motor required by said electric motor at least in accordance with the steering force detected by said steering force detecting means, thereby controlling the motor current;

motor current limiting means for comparing said motor current target value with a predetermined value so as to limit said motor current within a predetermined range; and abnormal motor current detecting means for detecting an abnormality in the motor current in accordance with said motor current target value and said detected motor current value;

wherein said motor is controlled by said motor control means within a range not subject to limitation by said motor current limiting means.

* * * * *